(12) United States Patent
Jansson Toftgård et al.

(10) Patent No.: US 12,400,668 B2
(45) Date of Patent: Aug. 26, 2025

(54) COMFORT NOISE GENERATION FOR MULTI-MODE SPATIAL AUDIO CODING

(71) Applicant: Telefonaktiebolaget LM Ericsson (publ), Stockholm (SE)

(72) Inventors: Tomas Jansson Toftgård, Uppsala (SE); Charles Kinuthia, Stockholm (SE); Fredrik Jansson, Sundbyberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 413 days.

(21) Appl. No.: 18/015,050

(22) PCT Filed: Jul. 6, 2021

(86) PCT No.: PCT/EP2021/068565
§ 371 (c)(1),
(2) Date: Jan. 6, 2023

(87) PCT Pub. No.: WO2022/008470
PCT Pub. Date: Jan. 13, 2022

(65) Prior Publication Data
US 2023/0282220 A1  Sep. 7, 2023

Related U.S. Application Data

(60) Provisional application No. 63/048,875, filed on Jul. 7, 2020.

(51) Int. Cl.
*G10L 19/012* (2013.01)
*G10L 19/008* (2013.01)
(52) U.S. Cl.
CPC .......... *G10L 19/012* (2013.01); *G10L 19/008* (2013.01)

(58) Field of Classification Search
CPC .................................................... G10L 19/012
See application file for complete search history.

(56) References Cited

U.S. PATENT DOCUMENTS

2013/0223633 A1  8/2013  Oshikiri et al.

FOREIGN PATENT DOCUMENTS

GB  2596138 A  * 12/2021  ........... G10L 19/008
WO  2015/122809 A1  8/2015
(Continued)

OTHER PUBLICATIONS

Wang, et al., "Linear Prediction Based Comfort Noise Generation in the EVS Codec," IEEE ICASSP, 2015. (Year: 2015).*

(Continued)

*Primary Examiner* — Feng-Tzer Tzeng
(74) *Attorney, Agent, or Firm* — Rothwell, Figg, Ernst & Manbeck, P.C.

(57) ABSTRACT

A method for generating comfort noise is provided. The method includes providing a first set of background noise parameters $N_1$ for at least one audio signal in a first spatial audio coding mode and a second set of background noise parameters $N_2$ for the at least one audio signal in a second spatial audio coding mode. The first spatial audio coding mode is used for active segments; the second spatial audio coding mode is used for inactive segments. The method further includes adapting the first set of background noise parameters $N_1$ to the second spatial audio coding mode, thereby providing a first set of adapted background noise parameters $\hat{N}_1$. The method further includes generating comfort noise parameters by combining $\hat{N}_1$ and $N_2$ over a transition period. The method further includes generating comfort noise based on the comfort noise parameters.

26 Claims, 14 Drawing Sheets

(56) References Cited

FOREIGN PATENT DOCUMENTS

WO        2019/193149 A1    10/2019
WO        WO-2020002448 A1 *   1/2020   .......... G10L 19/008

OTHER PUBLICATIONS

Lombard, et al. "Frequency-Domain Comfort Noise Generation for Discontinuous Transmission in EVS," IEEE ICASSP, 2015. (Year: 2015).*
International Search Report and Written Opinion dated Oct. 5, 2021 in International Application No. PCT/EP2021/068565 (9 pages).
3GPP TS 26.445 V16.0.0, Technical Specification, 3rd Generation Partnership Project; Technical Specification Group Services and System Aspects; Codec for Enhanced Voice Services (EVS); Detailed Algorithmic Description (Release 16), Jun. 2019 (661 pages).

* cited by examiner

COMFORT NOISE GENERATION FOR MULTI-MODE SPATIAL AUDIO CODING

CROSS REFERENCE TO RELATED APPLICATIONS

This application is a 35 U.S.C. § 371 National Stage of International Patent Application No. PCT/EP2021/068565, filed Jul. 6, 2021, which claims priority to U.S. provisional patent application No. 63/048,875, filed on Jul. 7, 2020. The above-identified applications are incorporated by this reference.

TECHNICAL FIELD

Disclosed are embodiments related to multi-mode spatial audio discontinuous transmission (DTX) and comfort noise generation.

BACKGROUND

Although the capacity in telecommunication networks is continuously increasing, it is still of great interest to limit the required bandwidth per communication channel. In mobile networks, less transmission bandwidth for each call means that the mobile network can service a larger number of users in parallel. Lowering the transmission bandwidth also yields lower power consumption in both the mobile device and the base station. This translates to energy and cost saving for the mobile operator, while the end user will experience prolonged battery life and increased talk-time.

One such method for reducing the transmitted bandwidth in speech communication is to exploit the natural pauses in speech. In most conversations, only one talker is active at a time; thus speech pauses in one direction will typically occupy more than half of the signal. The way to use this property of a typical conversation to decrease the transmission bandwidth is to employ a discontinuous transmission (DTX) scheme, where the active signal coding is discontinued during speech pauses. DTX schemes are standardized for all 3GPP mobile telephony standards, including 2G, 3G, and VoLTE. It is also commonly used in Voice over IP (VOIP) systems.

During speech pauses, it is common to transmit a very low bit rate encoding of the background noise to allow for a comfort noise generator (CNG) in the receiving end to fill the pauses with a background noise having similar characteristics as the original noise. The CNG makes the sound more natural since the background noise is maintained and not switched on and off with the speech. Complete silence in inactive segments (such as pauses in speech) is perceived as annoying and often leads to the misconception that the call has been disconnected.

A DTX scheme may include a voice activity detector (VAD), which indicates to the system whether to use the active signal encoding methods (when voice activity is detected) or the low rate background noise encoding (when no voice activity is detected). This is shown schematically in FIG. 1. System 100 includes VAD 102, Speech/Audio Coder 104, and CNG Coder 106. When VAD 102 detects voice activity, it signals to use the "high bitrate" encoding of the Speech/Audio Coder 104, while when VAD 102 detects no voice activity, it signals to use the "low bitrate" encoding of the CNG Coder 106. The system may be generalized to discriminate between other source types by using a (Generic) Sound Activity Detector (GSAD or SAD), which not only discriminates speech from background noise but also may detect music or other signal types which are deemed relevant.

Communication services may be further enhanced by supporting stereo or multichannel audio transmission. For stereo transmission, one solution is to use two mono codecs that independently encode the left and right parts of the stereo signal. A more sophisticated solution that normally is more efficient is to combine the encoding of the left and right input signal, so-called joint stereo coding. The terms signal(s) and channel(s) can in many situations be used interchangeably to denote the signals of the audio channels, e.g. the signals of the left and right channel for stereo audio.

SUMMARY

A common Comfort Noise (CN) generation method (which is used in all 3GPP speech codecs) is to transmit information on the energy and spectral shape of the background noise in the speech pauses. This can be done using a significantly smaller number of bits than the regular coding of speech segments. At the receiver side, the CN is generated by creating a pseudo random signal and then shaping the spectrum of the signal with a filter based on the information received from the transmitting side. The signal generation and spectral shaping can be done in the time or the frequency domain.

In a typical DTX system, the capacity gain comes partly from the fact that the CN is encoded with fewer bits than the regular encoding, but mainly from the fact that the CN parameters normally are sent less frequently than the regular coding parameters. This typically works well since the background noise character does not change as fast as e.g. a speech signal. The encoded CN parameters are transmitted in what often is referred to as a "SID frame," where SID stands for Silence Descriptor. A typical case is that the CN parameters are sent every 8th speech encoder frame, where one speech encoder frame is typically 20 ms. The CN parameters are then used as basis for the CNG in the receiver until the next set of CN parameters is received. FIG. 2 illustrates this schematically, showing that when "active encoding" is on, also called active segments or active coding segments, there is no "CN encoding," and when "active encoding" is not on, also called inactive segments or inactive coding segments, then "CN encoding" proceeds intermittently at every 8th frame.

One solution to avoid undesired fluctuations in the CN is to sample the CN parameters during all 8 speech encoder frames and then transmit a parameter based on all 8 frames (such as by averaging). FIG. 3 illustrates this schematically, showing the averaging interval over the 8 frames. Although a fixed SID interval of 8 frames is typical for speech codecs, a shorter or longer interval for transmission of CNG parameters may be used. The SID interval may also vary over time, for example based on signal characteristics such that the CN parameters are updated less frequently for stationary signals and more frequently for changing signals.

A speech/audio codec with a DTX system incorporates a low bit-rate coding mode that is used to encode inactive segments (e.g., non-speech segments), allowing the decoder to generate comfort noise with characteristics similar to the input signal characteristics. One example is the 3GPP EVS codec. In the EVS codec, there is also functionality in the decoder that analyses the signal during active segments and uses the result of this analysis to improve the generation of comfort noise in the next inactive segment.

The EVS codec is an example of a multimode codec where a set of different coding technologies are used to create a codec with great flexibility to handle e.g. different input signals and different network conditions. Future codecs will be even more flexible, supporting stereo and multichannel audio as well as virtual reality scenarios. To enable covering a wide range of input signals, such a codec will use several different coding technologies that may be selected adaptively depending on the characteristics of e.g. the input signal and the network conditions.

Given the specific purpose of the CN encoding and that it is desirable to keep the complexity of the CN encoding low, it is reasonable to have one specific mode for CN encoding even if the encoder incorporates several different modes for encoding speech, music, or other signals.

Ideally, the transition from active encoding to CN encoding should be inaudible, but this is not always possible to achieve. In the case where a coding technology that differs from the CN encoding is used to encode the active segments, the risk of an audible transition is higher. A typical example is shown in FIG. 4, where the level of the CN is higher than the preceding active segment. Note that although one signal is illustrated, similar audible transitions may be present for all channels.

Normally the comfort noise encoding process results in CN parameters that will allow the decoder to recreate a comfort noise with an energy corresponding to the energy of the input signal. In some cases, it may be advantageous to modify the level of the comfort noise, e.g. to lower it somewhat to get a noise suppression effect in speech pauses or to better match the level of the background noise being reproduced during the active signal encoding.

The active signal encoding may have a noise suppressing effect that makes the level of the reproduced background noise lower than in the original signal, especially when the noise is mixed with speech. This is not necessarily a deliberate design choice; it can be a side-effect of the used encoding scheme. If this level reduction is fixed or fixed for a specific encoding mode or by other means known in the decoder, it may be possible to reduce the level of the comfort noise with the same amount to make the transition from active encoding to comfort noise smooth. But if the level reduction (or increase) is signal dependent, there may be a step in the energy when the encoding switches from active encoding to CN encoding. Such a stepwise change in energy will be perceived as annoying by the listener, especially in the case where the level of the comfort noise is higher than the level of the noise in the active encoding preceding the comfort noise.

Further difficulties may arise for joint multi-channel audio codecs, e.g. a stereo codec, where not only monaural signals characteristics but also spatial characteristics such as inter-channel level difference, inter-channel coherence, etc., need to be considered. For encoding and representation of such multi-channel signals, separate coding (including DTX and CNG) for each channel is not efficient due to redundancies between the channels. Instead, various multi-channel encoding techniques may be utilized for a more efficient representation. A stereo codec may for example utilize different coding modes for different signal characteristics of the input channels, e.g. single vs multiple audio sources (talkers), different capturing techniques/microphone setups, but also utilizing a different stereo codec mode for the DTX operation.

For CN generation, compact parametric stereo representations are suitable, being efficient in representing signal and spatial characteristics for CN. Such parametric representations typically represent a stereo channel pair by a downmix signal and additional parameters describing the stereo image. However, for encoding of active signal segment different stereo encoding techniques might be more performant. Note that although one signal is illustrated, similar audible transitions may be present for all channels.

FIG. 4 illustrates an example operation of a multi-mode audio codec. For active segments, the codec operates in two spatial coding modes (mode_1, mode_2), e.g. stereo modes, selected for example depending on signal characteristics, bitrate, or similar control features. When the codec switches to inactive (SID) encoding using a DTX scheme, the spatial coding mode changes to a spatial coding mode used for SID encoding and CN generation (mode_CNG). It should be noted that mode_CNG may be similar or even identical to one of the modes used for active encoding, i.e. mode_1 or mode_2 in this example, in terms of their spatial representation. However, mode_CNG typically operates at a significantly lower bitrate than the corresponding mode for active signal encoding.

Multi-mode mono audio codecs, such as the 3GPP EVS codec, efficiently handle transitions between different modes of the codec and CN generation in DTX operation. These methods typically analyze signal characteristics at the end of the active speech segments, e.g. in the so called VAD hangover period where the VAD indicated background signal, but the regular transmission is still active to be on the safe side for avoidance of speech clipping. For multi-channel codecs, such existing techniques may however be insufficient and result in annoying transitions between active and inactive coding (DTX/CNG operation), especially when different spatial audio representations, or multi-channel/stereo coding techniques, are used for active and inactive (SID/CNG) encoding.

FIG. 4 shows the problem of an annoying transition going from active encoding utilizing a first spatial coding mode to inactive (SID) encoding and CN generation using a second spatial coding mode. Although existing methods for smooth active-to-inactive transitions for monaural signals are utilized, there may be clearly audible transitions due to the change of spatial coding modes.

Embodiments provide a solution to the issue of perceptually annoying active-to-inactive (CNG) transitions, by a transformation and adaptation of background noise characteristics estimated while operating in a first spatial coding mode to background noise characteristics suitable for CNG in a second spatial coding mode. The obtained background noise characteristics are further adapted based on parameters transmitted to the decoder in the second spatial coding mode.

Embodiments improve the transitions between active encoding and comfort noise (CN) for a multi-mode spatial audio codec by making the transition to CN smoother. This can enable the use of DTX for high quality applications and therefore reduce the bandwidth needed for transmission in such a service and also improve the perceived audio quality.

According to a first aspect, a method for generating comfort noise is provided. The method includes providing a first set of background noise parameters $N_1$ for at least one audio signal in a first spatial audio coding mode, wherein the first spatial audio coding mode is used for active segments. The method includes providing a second set of background noise parameters $N_2$ for the at least one audio signal in a second spatial audio coding mode, wherein the second spatial audio coding mode is used for inactive segments. The method includes adapting the first set of background noise parameters $N_1$ to the second spatial audio coding mode, thereby providing a first set of adapted background noise parameters $\hat{N}_1$. The method includes generating comfort noise parameters by combining the first set of adapted background noise parameters $\hat{N}_1$ and the second set of background noise parameters $N_2$ over a transition period. The method includes generating comfort noise for at least one output audio channel based on the comfort noise parameters.

In some embodiments, generating comfort noise for the at least one output audio channel comprises applying the generated comfort noise parameters to at least one intermediate audio signal. In some embodiments, generating comfort noise for the at least one output audio channel comprises upmixing of the at least one intermediate audio signal. In some embodiments, the at least one audio signal is based on signals of at least two input audio channels, and wherein the first set of background noise parameters $N_1$ and the second set of background noise parameters $N_2$ are each based on a single audio signal wherein the single audio signal is based on a downmix of the signals of the at least two input audio channels. In some embodiments, the at least one output audio channel comprises at least two output audio channels.

In some embodiments, providing a first set of background noise parameters $N_1$ comprises receiving the first set of background noise parameters $N_1$ from a node. In some embodiments, providing a second set of background noise parameters $N_2$ comprises receiving the second set of background noise parameters $N_2$ from a node. In some embodiments, adapting the first set of background noise parameters $N_1$ to the second spatial audio coding mode comprises applying a transform function. In some embodiments, the transform function comprises a function of $N_1$, $NS_1$, and $NS_2$, wherein $NS_1$ comprises a first set of spatial coding parameters indicating downmixing and/or spatial properties of the background noise of the first spatial audio coding mode and $NS_2$ comprises a second set of spatial coding parameters indicating downmixing and/or spatial properties of the background noise of the second spatial audio coding mode.

In some embodiments, applying the transform function comprises computing $\hat{N}_1 = s_{trans} N_1$, wherein $s_{trans}$ is a scalar compensation factor. In some embodiments, $s_{trans}$ has the following value:

$$s_{trans} = \frac{1}{2}\sqrt{\frac{1 + c + 2\sqrt{c \cdot C}}{c \cdot \text{ratio}_{LR}^2 + (1-\text{ratio}_{LR})^2 + 2\,\text{ratio}_{LR}(1-\text{ratio}_{LR})\sqrt{c \cdot C}}},$$

where $\text{ratio}_{LR}$ is a downmix ratio, C corresponds to a coherence or correlation coefficient, and c is given by $$c = \frac{(1+g)^2 + \gamma^2}{(1-g)^2 + \gamma^2},$$

where g and $\gamma$ are gain parameters. In some embodiments, $s_{trans}$ has the following value:

$$s_{trans} = \frac{1}{2}\sqrt{\frac{1 + c + 2\sqrt{c \cdot C}}{c \cdot \text{ratio}_{LR}^2 + (1-\text{ratio}_{LR})^2 + 2\,\text{ratio}_{LR}(1-\text{ratio}_{LR})\sqrt{c \cdot C}}},$$

where $\text{ratio}_{LR}$ is a downmix ratio, C corresponds to a coherence or correlation coefficient, and c is given by $$c = \frac{(1+g)^2 + \gamma^2}{(1-g)^2 + \gamma^2},$$

where g, $\gamma$ and $s_{right}$ are gain parameters.

In some embodiments, the transition period is a fixed length of inactive frames. In some embodiments, the transition period is a variable length of inactive frames. In some embodiments, generating comfort noise by combining the first set of adapted background noise parameters $\hat{N}_1$ and the second set of background noise parameters $N_2$ over a transition period comprises applying a weighted average of $\hat{N}_1$ and $N_2$. In some embodiments, generating comfort noise parameters by combining the first set of adapted background noise parameters $\hat{N}_1$ and the second set of background noise parameters $N_2$ over a transition period comprises computing $$CN = \left(1 - \frac{c_{inactive}}{k}\right)\hat{N}_1 + \frac{c_{inactive}}{k}N_2$$

where CN is the generated comfort noise parameter, $c_{inactive}$ is the current inactive frame count, and k is a length of the transition period indicating a number of inactive frames for which to apply the weighted average of $\hat{N}_1$ and $N_2$. In some embodiments, generating comfort noise parameters by combining the first set of adapted background noise parameters $\hat{N}_1$ and the second set of background noise parameters $N_2$ over a transition period comprises computing $$CN(b) = r_2(b)\hat{N}_1(b)$$

where $$r_2(b) = \min\left(1 + \frac{1}{k}(r_0(b) - 1)c_{inactive},\, r_0(b)\right),\ \text{if } c_{inactive} < k$$

$$r_2(b) = r_0(b),\ \text{otherwise}$$

$$r_0(b) = \frac{N_2(b)}{\hat{N}_1(b)}$$

where CN is the generated comfort noise parameter, $c_{inactive}$ is the current inactive frame count, k is a length of the transition period indicating a number of inactive frames for which to apply the weighted average of $\hat{N}_1$ and $N_2$, and b is a frequency sub-band index. In some embodiments, generating comfort noise parameters comprises computing $$CN(k_b) = r_2(b)\hat{N}_1(k_b)$$

for at least one frequency coefficient $k_b$ of frequency sub-band b.

In some embodiments, k is determined as $$k = -Mr_1 + M,\ \text{if } r_1 < 1$$

$$k = -M\left(\frac{1}{r_1}\right) + M,\ \text{otherwise}$$

where M is a maximum value for k, and $r_1$ is an energy ratio of estimated background noise levels determined as follows:

$$r_1 = \sqrt{\frac{\sum_{b=b_0}^{b_{N-1}} \hat{N}_1(b)}{\sum_{b=b_0}^{b_{N-1}} N_2(b)}}$$

where $b=b_0, \ldots, b_{N-1}$ are N frequency sub-bands, $\hat{N}_1(b)$ refers to adapted background noise parameters of $\hat{N}_1$ for the given sub-band b, and $N_2$ (b) refers to adapted background noise parameters of $N_2$ for the given sub-band b.

In some embodiments, generating comfort noise parameters by combining the first set of adapted background noise parameters $\hat{N}_1$ and the second set of background noise parameters $N_2$ over a transition period comprises applying a non-linear combination of $\hat{N}_1$ and $N_2$. In some embodiments, the method further includes determining to generate comfort noise parameters by combining the first set of adapted background noise parameters $\hat{N}_1$ and the second set of background noise parameters $N_2$ over a transition period, wherein generating comfort noise parameters by combining the first set of adapted background noise parameters $\hat{N}_1$ and the second set of background noise parameters $N_2$ over a transition period is performed as a result of determining to generate comfort noise parameters by combining the first set of adapted background noise parameters $\hat{N}_1$ and the second set of background noise parameters $N_2$ over a transition period.

In some embodiments, determining to generate comfort noise parameters by combining the first set of adapted background noise parameters $\hat{N}_1$ and the second set of background noise parameters $N_2$ over a transition period is based on a evaluating a first energy of a primary channel and a second energy of a secondary channel. In some embodiments, one or more of the first set of background noise parameters $N_1$, the second set of background noise parameters $N_2$, and the first set of adapted background noise parameters $\hat{N}_1$ include one or more parameters describing signal characteristics and/or spatial characteristics, including one or more of (i) linear prediction coefficients representing signal energy and spectral shape; (ii) an excitation energy; (iii) an inter-channel coherence; (iv) an inter-channel level difference; and (v) a side-gain parameter.

According to a second aspect, a node, the node comprising processing circuitry and a memory containing instructions executable by the processing circuitry, is provided. The processing circuitry is operable to provide a first set of background noise parameters $N_1$ for at least one audio signal in a first spatial audio coding mode, wherein the first spatial audio coding mode is used for active segments. The processing circuitry is operable to provide a second set of background noise parameters $N_2$ for the at least one audio signal in a second spatial audio coding mode, wherein the second spatial audio coding mode is used for inactive segments. The processing circuitry is operable to adapt the first set of background noise parameters $N_1$ to the second spatial audio coding mode, thereby providing a first set of adapted background noise parameters $\hat{N}_1$. The processing circuitry is operable to generate comfort noise parameters by combining the first set of adapted background noise parameters $\hat{N}_1$ and the second set of background noise parameters $N_2$ over a transition period. The processing circuitry is operable to generate comfort noise for at least one output audio channel based on the comfort noise parameters.

According to a third aspect, a computer program comprising instructions which when executed by processing circuitry causes the processing circuitry to perform the method of any one of the embodiments of the first aspect is provided.

According to a fourth aspect, a carrier containing the computer program of the third aspect is provided, wherein the carrier is one of an electronic signal, an optical signal, a radio signal, and a computer readable storage medium.

BRIEF DESCRIPTION OF THE DRAWINGS

The accompanying drawings, which are incorporated herein and form part of the specification, illustrate various embodiments.

DETAILED DESCRIPTION

In the following embodiment a stereo codec, including an encoder and a decoder, is described. The codec may utilize more than one spatial coding technology for a more efficient compression of stereo audio with various characteristics, e.g. single talker speech, double talker speech, music, background noise.

The codec may be used by a node (e.g., a user equipment (UE)). For example, two or more nodes may be in communication with each other, such as UEs that are connected via a telecommunications network using a network standard such as 3G, 4G, 5G, and so on. One node may be the "encoding" node, where speech is encoded and sent to a "decoding" node, where speech is decoded. The "encoding" node may send background noise parameters to the "decoding node," which may use those parameters to generate comfort noise according to any of the embodiments disclosed herein. The nodes may also switch between "encoding" and "decoding," such as when engaged in two-way speech. In this case, a given node may be both an "encoding" node and a "decoding" node, and may switch between one and the other or perform both tasks simultaneously.

Figure 5:
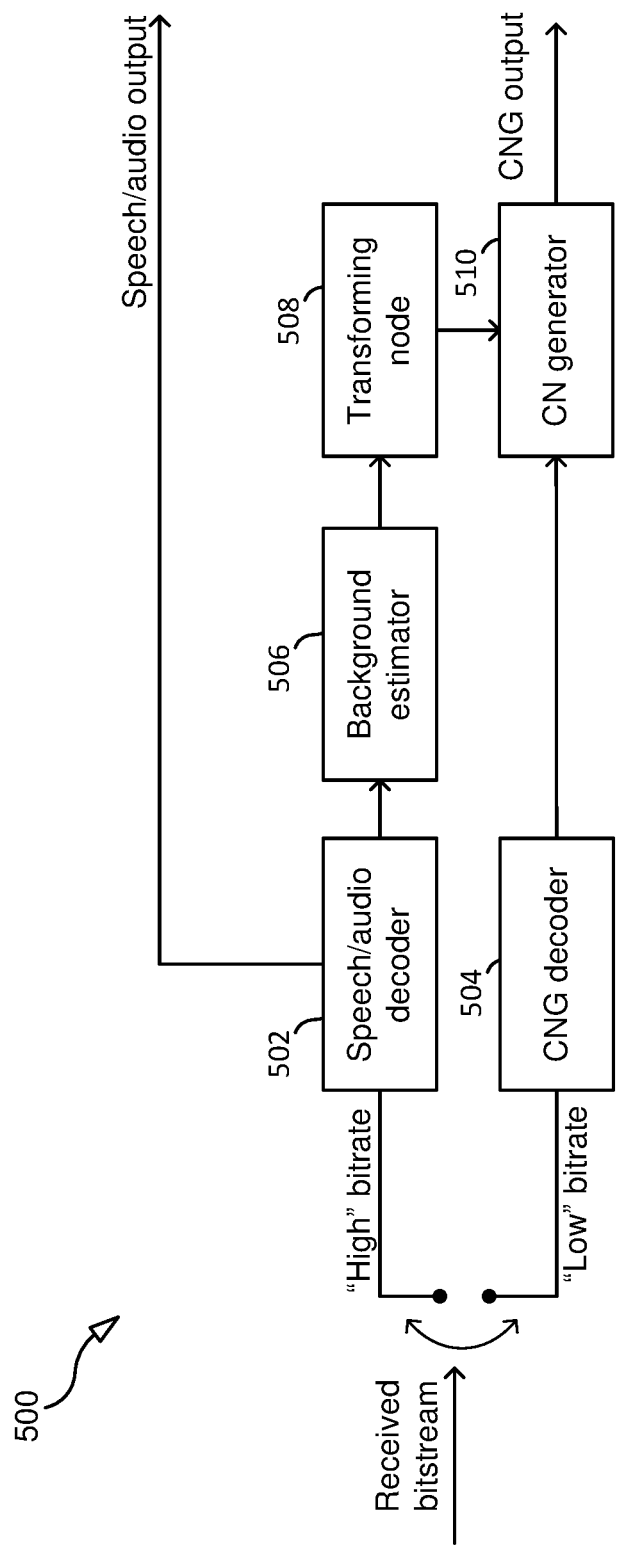
FIG. 5 illustrates a system for decoding comfort noise according to an embodiment.

FIG. 5 illustrates a system 500 for decoding comfort noise according to an embodiment. System 500 may include speech/audio decoder 502, CNG decoder 504, background estimator 506, transforming node 508, and CN generator 510. A received bitstream enters into the system 500, which may be either a "high" bitrate stream (for active segments) or a "low" bitrate stream (for inactive segments). If it is a "high" bitrate stream (for active segments), the stream is decoded by speech/audio decoder 502, which generates speech/audio output. Additionally, the output of speech/audio decoder 502 may be passed on to background estimator 506 which can estimate background noise parameters. The estimated background noise parameters may pass to the transforming node 508, which may apply a transformation to the parameters, which are then sent to the CN generator 510. If it is a "low" bitrate stream (for inactive segments), the stream is decoded by CNG decoder 504, and passed to the CN generator 510. CN generator 510 may generate comfort noise based on the decoded stream and may additionally utilize information from the transforming node 508 regarding background parameters estimated during active segments (and may also similarly utilize information from nodes 502 and/or 506). The result of the CN generator 510 is CNG output, which may be applied to an audio output channel.

Two-Channel Parametric Stereo Encoding

Joint stereo coding techniques aim to reduce the information needed to represent the audio channel pair (e.g., left and right channels) to be encoded. Various (down)mixing techniques may be used to form a pair of channels that are less correlated than the original left and right channels, and therefore that contain less redundant information, which makes the encoding more efficient. One such well-known technique is mid-side stereo, where the sum and difference of the input signals are forming a mid- and a side-channel. Further extensions utilize more adaptive downmixing schemes, aiming to minimize redundant information within the channels for a more efficient encoding. Such adaptive downmix may be done based on energy compaction techniques such as Principal Component Analysis or Karhunen-Loève transform, or any other suitable technique. The adaptive downmixing procedure may be written as:

$$P = \text{ratio}_{LR} \cdot L + (1 - \text{ratio}_{LR}) \cdot R$$

$$S = (1 - \text{ratio}_{LR}) \cdot L - \text{ratio}_{LR} \cdot R \quad (1)$$

Where P and S are respectively the primary and secondary (downmixed) channels, L and R are respectively the left and right channel inputs, and $\text{ratio}_{LR}$ is a downmix ratio.

The $\text{ratio}_{LR}$ downmix ratio is calculated based on the characteristics of the input signal; it may be based on e.g. inter-channel correlation and level difference. A fixed $\text{ratio}_{LR} = 0.5$ corresponds to the regular mid/side transformation. The downmixing may be performed in the time-domain on audio samples or in the frequency domain for frequency bins or sub-bands. In the equations provided here, the sample, bin, and/or sub-band indices have been left out for clarity of presentation.

In the decoder, the inverse operation (upmix) is performed using the decoded parameter $\text{ratio}'_{LR}$ and the decoded channels P' and S' to recreate the left and right output signals (L' and R' respectively):

$$L' = K \cdot (\text{ratio}'_{LR} \cdot P' + (1 - \text{ratio}'_{LR}) \cdot S')$$

$$R' = K \cdot ((1 - \text{ratio}'_{LR}) \cdot P' - \text{ratio}'_{LR} \cdot S') \quad (2)$$

where $$K = \frac{1}{2 \cdot \text{ratio}'^2_{LR} - 2 \cdot \text{ratio}'_{LR} + 1} \quad (3)$$

In this case the downmix parameter $\text{ratio}_{LR}$ is typically encoded and transmitted to the decoder for the upmix. Additional parameters may be utilized to improve the compression efficiency further.

One-Channel Parametric Stereo Encoding

Depending on the signal characteristics, other stereo coding techniques may be more efficient than two-channel parametric stereo encoding. Especially for CNG, the bitrate of the transmitted SID parameters needs to be reduced for an efficient DTX system. In such a case, only one of the downmix channels (e.g. P) may be described or encoded. In this case, additional parameters encoded and transmitted to the decoder may be used to estimate the other channel (e.g. S) needed for the upmix. The stereo parameters will allow the decoder to, in an approximate way, reverse the encoder downmix and recreate (upmix) a stereo signal (the upmixed signal pair) from the decoded mono mixdown signal.

Figure 6:
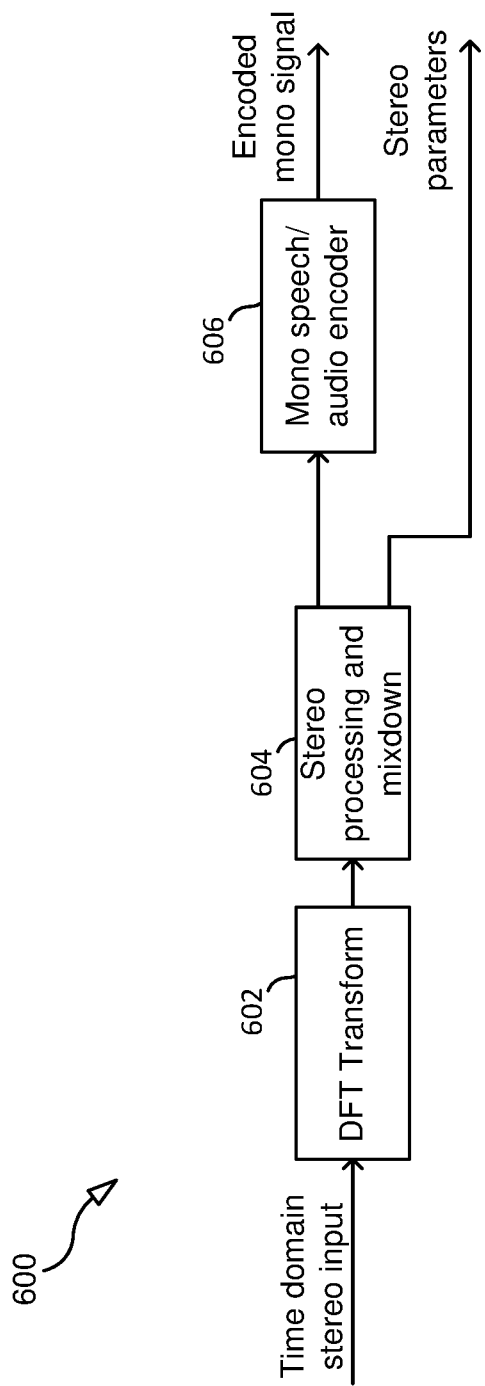
FIG. 6 illustrates an encoder according to an embodiment.
Figure 7:
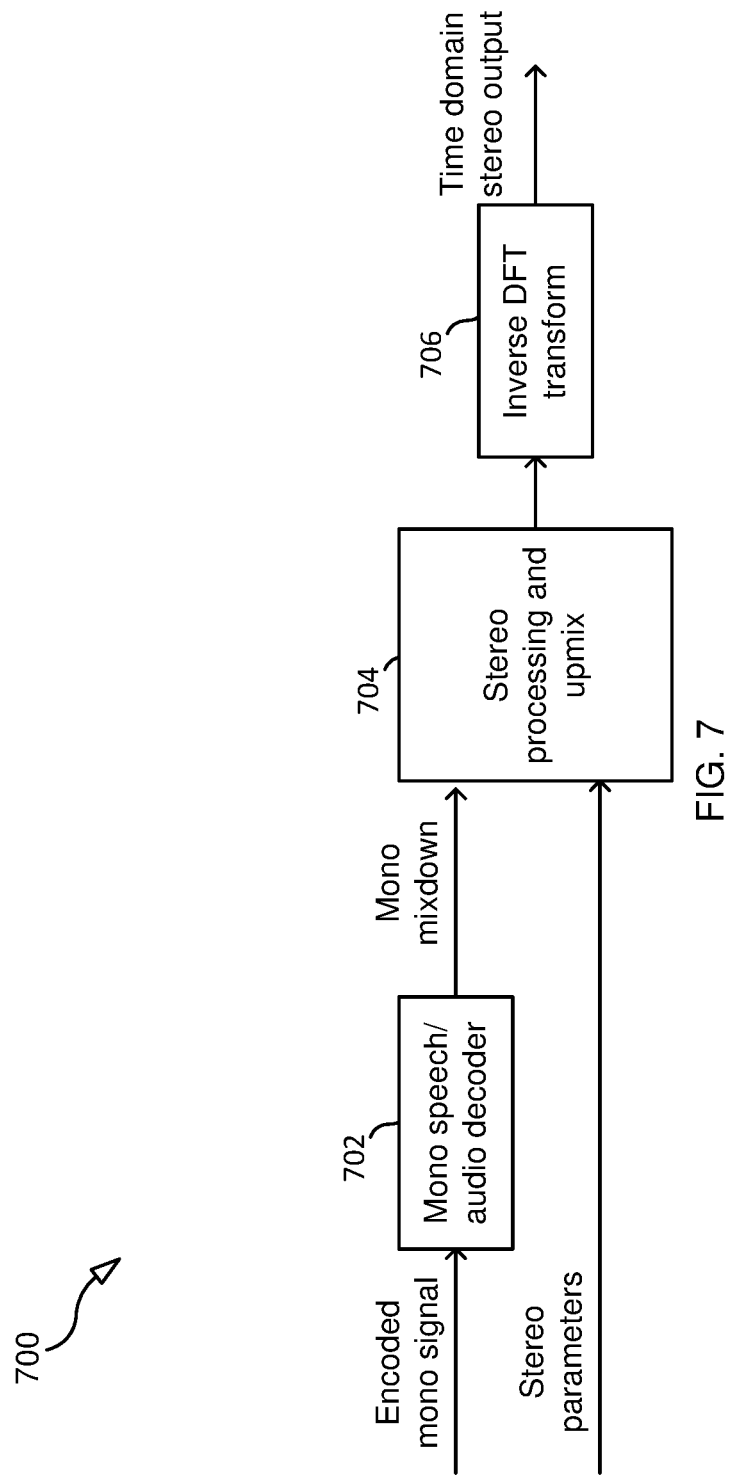
FIG. 7 illustrates a decoder according to an embodiment.

A block diagram of an encoder and a decoder operating in the discrete Fourier transform (DFT) domain is shown in FIGS. 6 and 7. As shown in FIG. 6, encoder 600 includes DFT transform unit 602, stereo processing and mixdown unit 604, and mono speech/audio encoder 606. Time domain stereo input enters into encoder 600, where it is subject to a DFT transform by DFT transform unit 602. DFT transform unit 602 may then pass its output (DFT-transformed signals) onto stereo processing and mixdown unit 604. Stereo processing and mixdown unit 604 may then perform stereo processing and mixdown, outputting a mono channel mixdown (or downmix) and stereo parameters. The mono channel mixdown may be passed to the mono speech/audio encoder 606, which produces an encoded mono signal. As shown in FIG. 7, decoder 700 includes mono speech/audio decoder 702, stereo processing and upmix unit 704, and inverse DFT transform unit 706. An encoded mono signal and stereo parameters enters into decoder 700. The encoded mono signal is passed to mono speech/audio decoder 702, which results in a mono mixdown signal being sent to the stereo processing and upmix unit 704. The stereo processing and upmix unit 704 also receives the stereo parameters, and uses these to perform stereo processing and upmix on the mono mixdown signal. The output is then passed to the inverse DFT transform unit 706, which outputs a time domain stereo output.

Suitable parameters describing the spatial characteristics of stereo signals typically relates to inter-channel level difference (ILD), inter-channel coherence (IC), inter-channel phase difference (IPD) and inter-channel time difference (ITD), among other possibilities.

The processing in the encoder to create the downmix signal and to extract the stereo parameters may be done in the time-domain; or, the processing may be done in the frequency domain by first transforming the input signal to the frequency domain, e.g. by the discrete Fourier transform (DFT) or any other suitable filter bank. This also applies to the decoder where the processing, e.g. for stereo synthesis, may be done in the time-domain or the in the frequency domain. For frequency-domain processing, a frequency adaptive downmixing procedure may be used to optimize the downmix for different frequency bands, e.g. to avoid signal cancellation in the downmix signal. Further, the channels may be time aligned prior to downmixing based on the inter-channel time difference determined at the encoder.

For CNG, the P and S signals may be generated at the decoder from noise signals spectrally shaped based on transmitted SID parameters describing the spectral properties of the estimated background noise characteristics. In addition, the coherence, level, time, and phase differences between the channels may be described to allow for a good reconstruction of the spatial characteristics of the background noise represented by the CN.

In one embodiment, a side gain parameter g is used to estimate or predict S from P by describing the component of S which is coherent to P. The side gain may be estimated as the normalized inner product (or dot product):

$$g = \frac{<P, S>}{<P, P>} \quad (4)$$

where $<\cdot,\cdot>$ denotes the inner product of the P and S signals. This may be illustrated as the projection of S onto P in the multi-dimensional space spanned by P and S, e.g. being vectors of time-domain samples or correspondingly in the frequency domain.

With a passive downmix, such as the following, $$P=0.5 \cdot (L+R)$$

$$S=0.5 \cdot (L-R) \quad (5)$$

the corresponding upmix may be obtained as:

$$L'=(1+g)P'+\gamma \hat{P}'$$

$$R'=(1-g)P'-\gamma \hat{P}' \quad (6)$$

where $\hat{P}'$ is uncorrelated with P', having the same spectral characteristics and signal energy as P'. Here, $\gamma$ is the gain factor for the uncorrelated component $\hat{P}'$, which may be obtained from the inter-channel coherence as follows:

$$\gamma = \sqrt{\frac{C}{1-C}+1-g^2} - \sqrt{\frac{C}{1-C}} \quad (7)$$

The channel coherence C for a given frequency f is given by:

$$C(f) = \frac{|S_{xy}(f)|^2}{S_{xx}(f)S_{yy}(f)} \quad (8)$$

where $S_{xx}(f)$ and $S_{yy}(f)$ represent the respective power spectrum of the two channels x and y, and $S_{xy}(f)$ is the cross power spectrum of the two channels x and y. In a DFT based solution, the spectra may be represented by the DFT spectra. Particularly, according to an embodiment the spatial coherence C(m, k) for frame index m and frequency bin index k is determined as:

$$C(m, k) = \frac{|L(m, k)^* \cdot R(m, k)|^2}{|L(m, k)|^2 \cdot |R(m, k)|^2} \quad (9)$$

where L(m, k) and R(m, k) denote the left and right channels for frame m and frequency bin k.

Alternatively, or in addition, an inter-channel cross correlation (ICC) may be estimated. A conventional ICC estimation relies on the cross-correlation function (CCF) $r_{xy}$, which is a measure of similarity between two waveforms x[n] and y[n], and is generally defined in the time domain as follows:

$$r_{xy}[n,\tau]=E[x[n]y[n+\tau]]r_{xy}[n,\tau]=E[x[n]y[n+\tau]], \quad (10)$$

where $\tau$ is the time-lag and $E[\cdot]$ the expectation operator. For a signal frame of length N, the cross-correlation is typically estimated as:

$$r_{xy}[\tau]=\Sigma_{n=0}^{N-1}x[n]y[n+\tau]r_{xy}[\tau]=\Sigma_{n=0}^{N-1}x[n]y[n+\tau] \quad (11)$$

The ICC is then obtained as the maximum of the CCF which is normalized by the signal energies as follows:

$$ICC = \max\left(\frac{r_{xy}[\tau]}{\sqrt{r_{xx}[0]r_{yy}[0]}}\right) \quad (12)$$

In such a case, the gain factor $\gamma$ may be computed as:

$$\gamma = \sqrt{\frac{ICC^2}{1-ICC^2}+1-g^2} - \sqrt{\frac{ICC^2}{1-ICC^2}} \quad (13)$$

Figure 10:
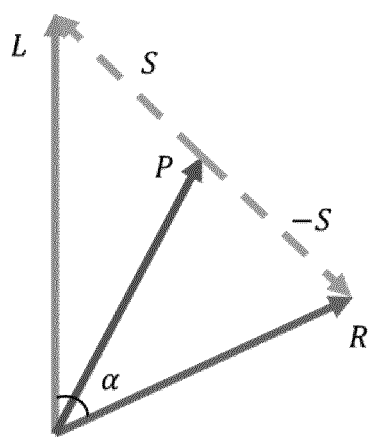
FIG. 10 is a schematic representation of a stereo downmix according to an embodiment.

It may be noted that the coherence or correlation coefficient corresponds to the angle $\alpha$ illustrated in FIG. 10, where $\cos(\alpha)=\sqrt{C}=ICC$.

Further, inter-channel phase and time differences or similar spatial properties may be synthesized if there are parameters available describing those properties.

DTX Operation with Stereo Mode Transition

Figure 1:
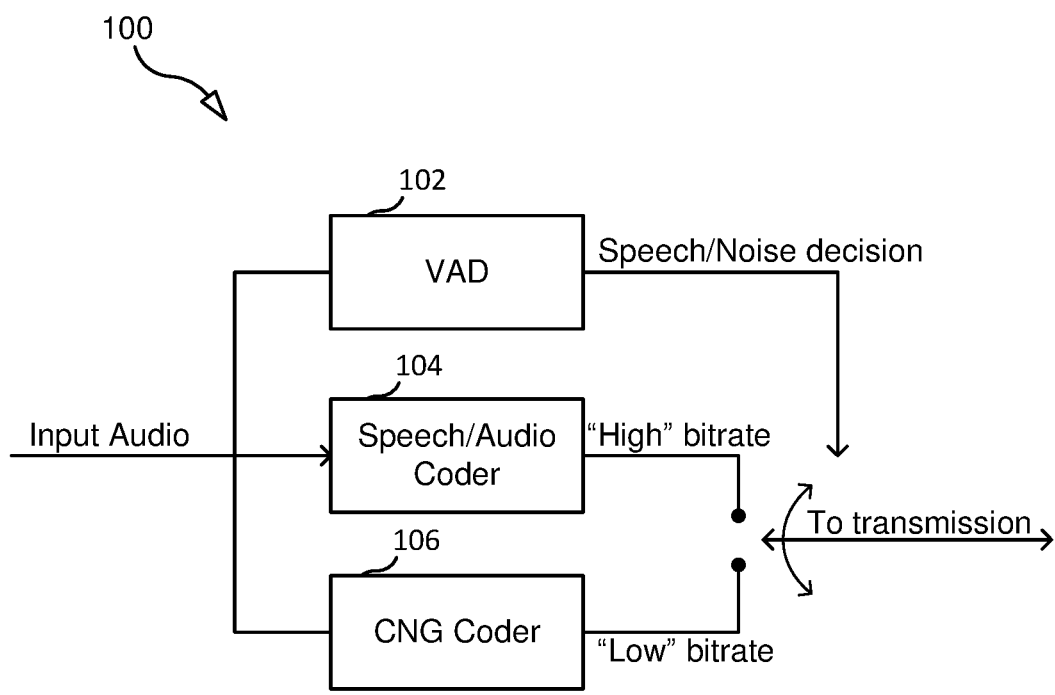
FIG. 1 illustrates a system for generating comfort noise.
Figure 2:
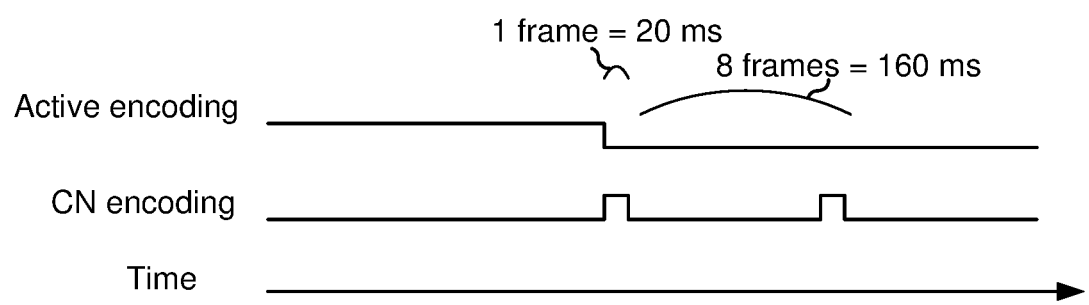
FIG. 2 illustrates encoding for active and inactive segments.
Figure 3:
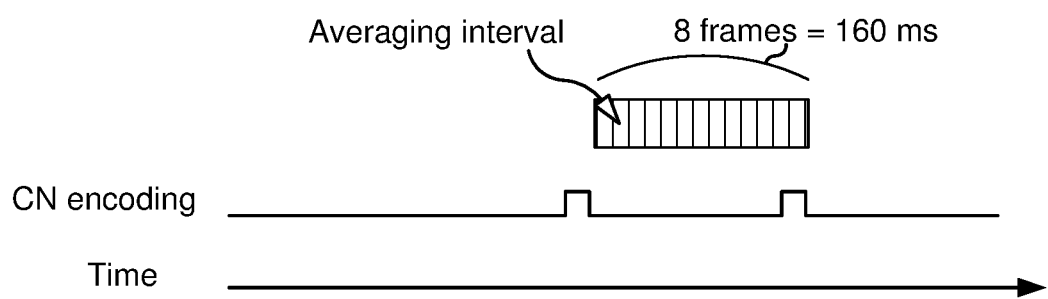
FIG. 3 illustrates encoding for inactive segments.
Figure 4:
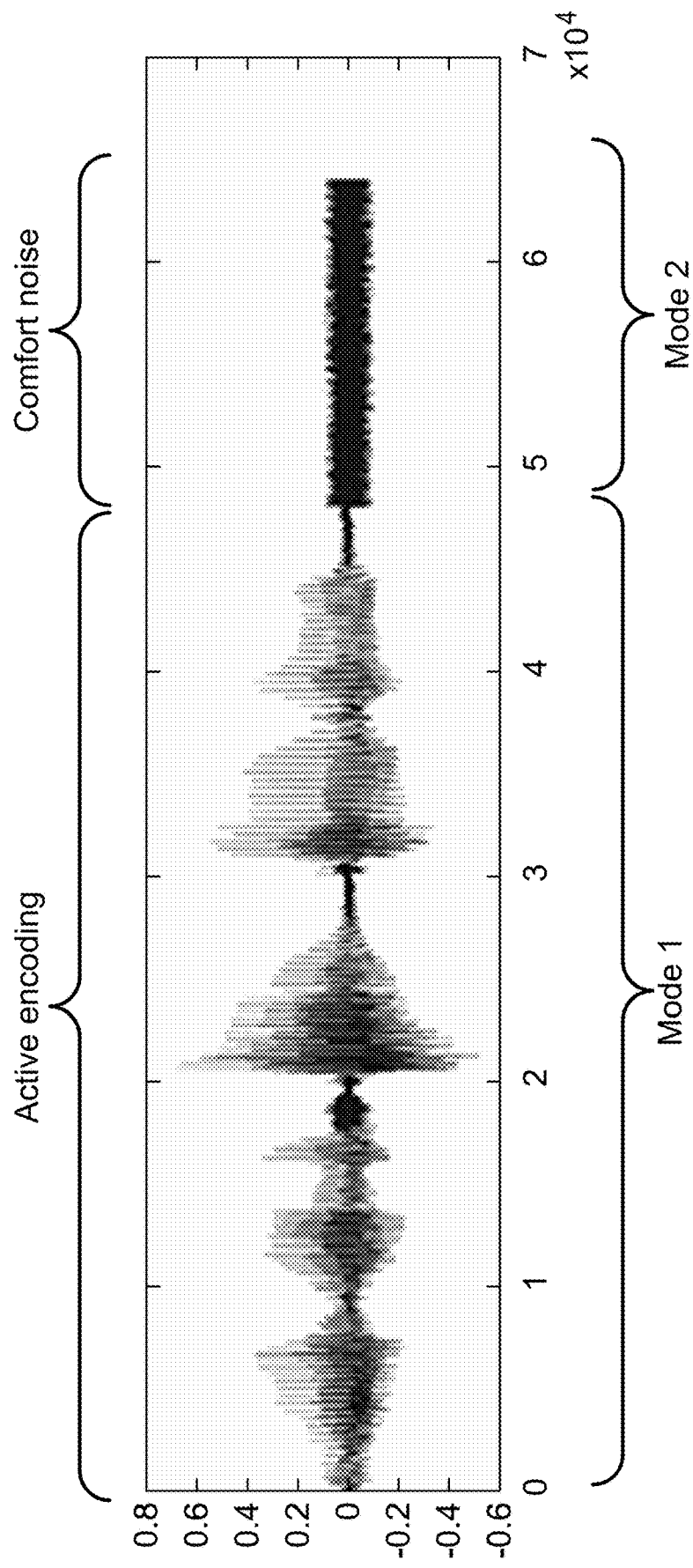
FIG. 4 illustrates encoding for active and inactive segments using multiple encoding modes.

In an example embodiment, the stereo codec is operating according to FIG. 4, utilizing a first stereo mode for active signal encoding and a second stereo mode for inactive (SID) encoding for CNG at the decoder.

Background Noise Estimation

Figure 9:
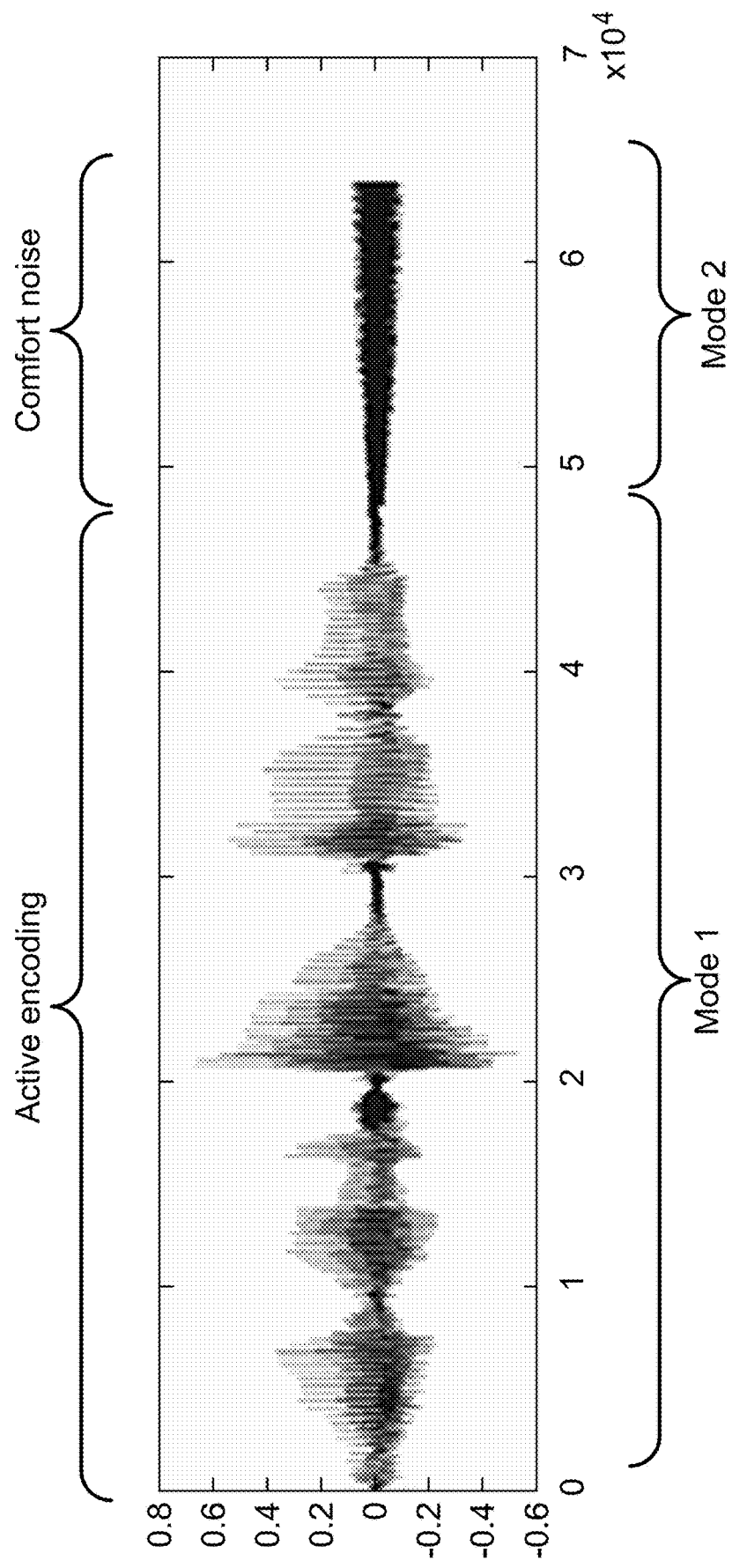
FIG. 9 illustrates encoding for active and inactive segments using multiple encoding modes according to an embodiment.

In embodiments, parameters for comfort noise generation (CNG) in a transition segment are determined based on two different background noise estimates. FIG. 9 shows an example of such a transition segment at the beginning of a comfort noise segment. A first background noise estimate may be determined based on background noise estimation performed by the decoder while operating in the first stereo mode, e.g. based on a minimum statistics analysis of the decoded audio signal. A second background noise estimate may be determined based on estimated background noise characteristic of the encoded audio signal being determined at the encoder operating in the second stereo mode for SID encoding.

The background noise estimates may include one or more parameters describing the signal characteristics, e.g. signal energy and spectral shape described by linear prediction coefficients and an excitation energy or equivalent representations (e.g., line spectral pairs (LSP), line spectral frequencies (LSF), etc.). The background noise characteristics may also be represented in a transform domain, such as the Discrete Fourier Transform (DFT) or Modified Discrete Cosine Transform (MDCT) domain, e.g. as magnitude or power spectra. Using minimum statistics to estimate a level and spectral shape of the background noise during active encoding is just one example of a technique that can be used; other techniques may also be used. Additionally, downmixing and/or spatial properties of the background estimates may be estimated, encoded, and transmitted to the decoder, e.g. in the SID frames.

In one embodiment, a first set of background noise parameters $N_1$ describe the spectral characteristic of the P channel of the first stereo coding mode. A set of spatial coding parameters $N_{S1}$ describes downmixing and/or spatial properties of the background noise of the first stereo mode. A second set of background noise parameters $N_2$ describes the spectral characteristic of the P channel of the second stereo coding mode. A set of spatial coding parameters $N_{S2}$ describes downmixing and/or spatial properties of the background noise of the second stereo mode.

In one embodiment the set of spatial coding parameters $N_{S1}$ includes a downmix parameter, such as downmix parameter ratio's corresponding to the mixing factor according to eq. (1).

In one embodiment the set of spatial coding parameters $N_{S2}$ includes a first gain parameter g corresponding to a gain of the component of S that is coherent (correlated) with P, and a second gain parameter $\gamma$ corresponding to a gain of the component of S that is incoherent (uncorrelated) with P. The spatial coding parameters $N_{S2}$ may represent a complete frame of audio samples or the corresponding gain in a specific frequency sub-band. The latter implies that there are sets of gain parameters g and $\gamma$ representing the gain parameters of the frame of audio samples. In another embodiment the second gain parameter $\gamma$ is determined at the decoder based on an inter-channel coherence (IC) or correlation coefficient (ICC) being received at the decoder. Similarly, the inter-channel coherence may be described in frequency sub-bands resulting in a set of parameters per audio frame.

Even though various representations, such as frequency sub-band energies or linear prediction coefficients and an excitation energy, may be used to describe the background noise characteristics, $N_1$ and $N_2$ may be converted into a common representation such as the DFT domain. This means that $N_1$ and $N_2$ may be obtained as functions of the determined parameters describing the background noise characteristics, e.g. by a DFT transform. In one embodiment the background noise parameters $N_1$ and $N_2$ are represented as frequency band energies or magnitudes.

Background Noise Estimate Transformation

For a smooth transition going from active signal encoding in the first stereo mode to SID encoding and CNG at the decoder, the first set of background noise parameters $N_1$ (originating from the first stereo mode) is adapted to the second stereo mode utilized for SID encoding and CNG. A transformed set of parameters $\hat{N}_1$ may be determined as:

$$\hat{N}_1 = f(N_1) \qquad (14)$$

where $f(\cdot)$ is the transform function. The transform function may be frequency-dependent or constant over all frequencies.

In another embodiment the transformed set of parameters $\hat{N}_1$ may be determined as:

$$\hat{N}_1 = f(N_1, N_{S1}, N_{S2}) \qquad (15)$$

In one embodiment the transformed set of parameters $\hat{N}_1$ is determined as a scaled version of $N_1$:

$$\hat{N}_1 = s_{trans} N_1 \qquad (16)$$

where $s_{trans}$ is a scalar compensation factor for the energy difference of P between the two stereo modes.

If the downmix for the first stereo mode is $$P_1 = (1 - \text{ratio}_{LR}) \cdot R + \text{ratio}_{LR} \cdot L$$

$$S_1 = (1 - \text{ratio}_{LR}) \cdot L - \text{ratio}_{LR} \cdot R \qquad (17)$$

and for the second stereo mode $$P_2 = 0.5 \cdot (L + R)$$

$$S_2 = 0.5 \cdot (L - R) \qquad (18)$$

a scaling factor $s_{trans}$ may be determined as:

$$s_{trans}^2 = \frac{|P_2|^2}{|P_1|^2} = \frac{1}{4} \cdot \frac{|L|^2 + |R|^2 + 2|L||R|\cos(\alpha)}{\text{ratio}_{LR}^2 |L|^2 + (1-\text{ratio}_{LR})^2 |R|^2 + 2\text{ratio}_{LR}(1-\text{ratio}_{LR})|L||R|\cos(\alpha)} = \qquad (19)$$

$$\frac{1}{4} \cdot \frac{c + 1 + 2\sqrt{c} \cdot \cos(\alpha)}{c \cdot \text{ratio}_{LR}^2 + (1-\text{ratio}_{LR})^2 + 2\text{ratio}_{LR}(1-\text{ratio}_{LR})\sqrt{c} \cdot \cos(\alpha)} =$$

$$\frac{1}{4} \cdot \frac{1 + c + 2\sqrt{c \cdot C}}{c \cdot \text{ratio}_{LR}^2 + (1-\text{ratio}_{LR})^2 + 2\text{ratio}_{LR}(1-\text{ratio}_{LR})\sqrt{c \cdot C}}$$

$$\Rightarrow s_{trans} = \frac{1}{2} \sqrt{\frac{1 + c + 2\sqrt{c \cdot C}}{c \cdot \text{ratio}_{LR}^2 + (1-\text{ratio}_{LR})^2 + 2\text{ratio}_{LR}(1-\text{ratio}_{LR})\sqrt{c \cdot C}}}$$

where $$c = \frac{|L|^2}{|R|^2} = \frac{(1+g)^2 + \gamma^2}{(1-g)^2 + \gamma^2} \qquad (20)$$

The downmix factor $\text{ratio}_{LR}$ originates from $N_{S1}$ (the first stereo mode) while the gain parameters g and $\gamma$ originate from $N_{S2}$ (the second stereo mode).

In another embodiment energy differences between the channels may be compensated at the encoder. The downmix for the first stereo mode may then be determined by:

$$P_1 = (1 - \text{ratio}_{LR}) \cdot s_{right} \cdot R + \text{ratio}_{LR} \cdot L$$

$$S_1 = (1 - \text{ratio}_{LR}) \cdot L - \text{ratio}_{LR} \cdot s_{right} \cdot R \qquad (21)$$

The scaling factor $s_{trans}$ may then be determined as:

$$s_{trans} = \frac{1}{2} \sqrt{\frac{1 + c + 2\sqrt{c \cdot C}}{c \cdot \text{ratio}_{LR}^2 + (1-\text{ratio}_{LR})^2 s_{right}^2 + 2\text{ratio}_{LR}(1-\text{ratio}_{LR}) s_{right} \sqrt{c \cdot C}}} \qquad (22)$$

In one embodiment the scaling factor $s_{trans}$ is determined in frequency sub-bands b.

In another embodiment the scaling factor $s_{trans}$ is determined in fullband (no frequency sub-bands) based on spatial coding parameters obtained in frequency sub-bands b. In this case, an average scaling factor $s_{trans}$ may be determined, e.g. as the arithmetic mean:

$$s_{trans} = \frac{1}{N} \sum_{b=0}^{N-1} s_{trans}(b) \qquad (23)$$

where $s_{trans}(b)$ is determined for each frequency sub-band b as described above in eq. (19) or (22) with sub-band dependent parameters.

Comfort Noise Generation

Once the first set of background noise parameters $N_1$ are adapted to the second stereo mode, being transformed to $\hat{N}_1$, comfort noise is being generated by the codec operating in the second stereo mode. For a smooth transition, the parameters for CN are determined as a weighted sum of the two background noise estimates $\hat{N}_1$ and $N_2$.

In the beginning of the transition segment a larger weight is put on the transformed first background noise estimate (based on the estimate from the preceding active segment) and at the end of the transition segment a larger weight is put on the second background noise estimate (based on the received SID parameters). With a smooth shift of the weighting between the first and second background noise estimate a smooth transition between active segments and inactive segments is achieved.

The transition segment may be of either fixed or adaptively varying length.

A comfort noise parameter CN may be determined as:

$$CN = \left(1 - \frac{c_{inactive}}{k}\right)\hat{N}_1 + \frac{c_{inactive}}{k}N_2, \text{ if } 0 < c_{inactive} \leq k \quad (24)$$
$$CN = N_2, \text{ if } c_{inactive} > k$$

where:
$\hat{N}_1$ is the transformed background noise parameters based on minimum statistics of the first stereo mode coding;
$N_2$ is the comfort noise parameters based on SID frames of the second stereo mode coding;
$c_{inactive}$ is the counter for the number of inactive frames; and
k is the length of the crossfade.

When k increases the transition between background noise level in active coding to that of CN generated using CNG parameters takes longer. In this case a linear cross-fade between $\hat{N}_1$ and $N_2$ is obtained, but other transition functions may be used with similar effects. The length of the crossfade may be fixed or adaptive based on the background noise parameters.

In one embodiment an adaptive crossfade length k is determined as:

$$k = -Mr_1 + M, \quad \text{if } r_1 < 1 \quad (25)$$
$$k = -M\left(\frac{1}{r_1}\right) + M, \text{ otherwise}$$

where M is the maximum number of frames in which crossfade can be applied, e.g. being set to 50 frames, and $$r_1 = \sqrt{\frac{\sum_{b=b_0}^{b_{N-1}} \hat{N}_1(b)}{\sum_{b=b_0}^{b_{N-1}} N_2(b)}} \quad (26)$$

is an energy ratio of the estimated background noise levels, e.g. the sum of frequency sub-band $b=b_0, \ldots, b_{N-1}$ energies of $\hat{N}_1$ and $N_2$.

In another embodiment a cross-fade between $\hat{N}_1$ and $N_2$ is obtained as $$CN(b) = r_2(b)\hat{N}_1(b) \quad (27)$$

where $$r_2(b) = \min\left(1 + \frac{1}{k}(r_0(b) - 1)c_{inactive}, r_0(b)\right), \text{ if } c_{inactive} < k \quad (28)$$
$$r_2(b) = r_0(b), \text{ otherwise}$$
$$r_0(b) = \frac{N_2(b)}{\hat{N}_1(b)}$$

where b is a frequency sub-band index and k may be adaptive of fixed, e.g. k=50. In one embodiment the frequency sub-band b may correspond to several frequency coefficients $k_b$, such that $CN(k_b) = r_2(b)\hat{N}_1(k_b)$ for the frequency bins $k_b$ of frequency sub-band b.

Figure 11:
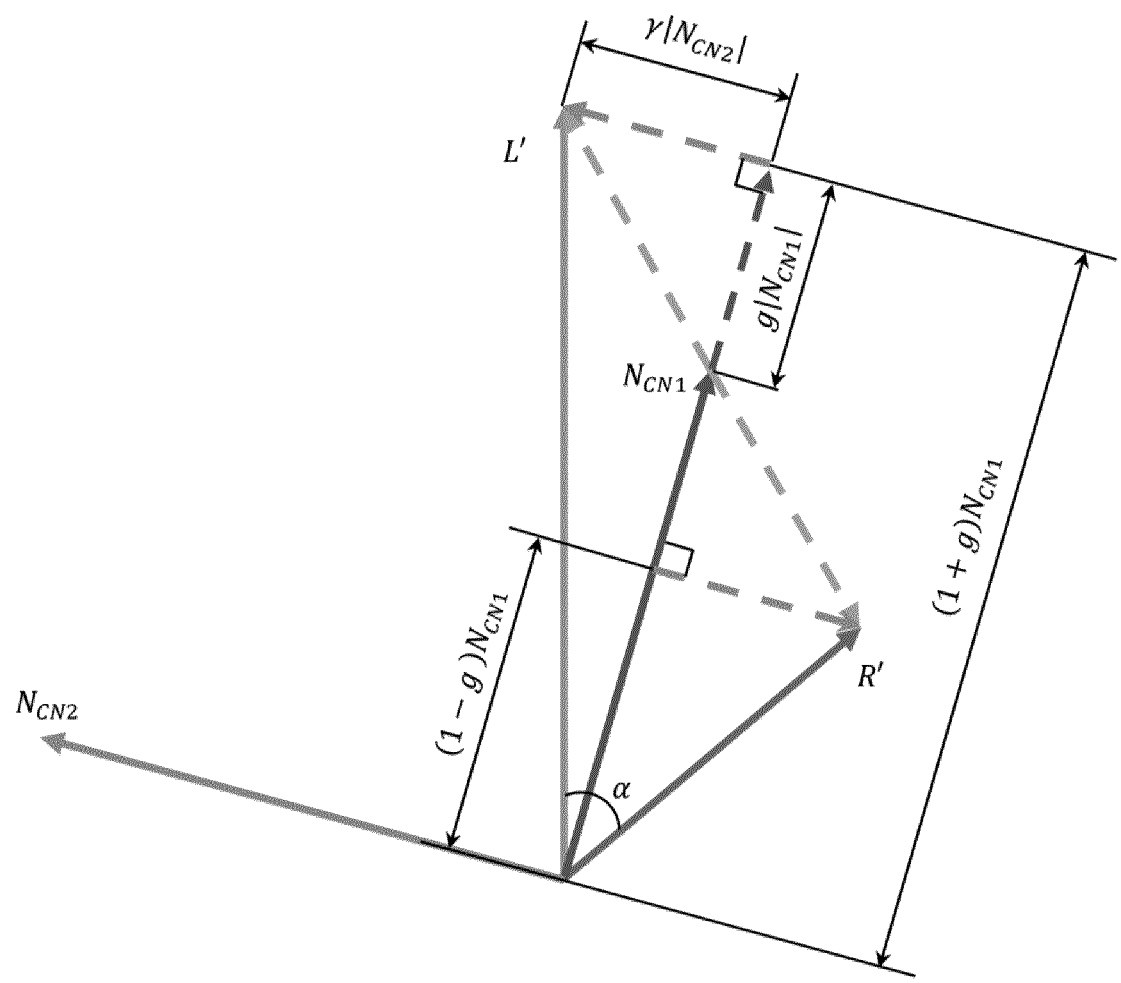
FIG. 11 is a schematic representation of a stereo upmix according to an embodiment.

Based on the obtained comfort noise parameters CN(b) stereo channels may be synthesized, in stereo mode 2 in accordance with eq. (6), i.e.

$$L' = (1+g)N_{CN1} + \gamma N_{CN2}$$
$$R' = (1-g)N_{CN1} - \gamma N_{CN2} \quad (29)$$

where $N_{CN1}$ and $N_{CN2}$ are uncorrelated random noise signals spectrally shaped based on the obtained comfort noise parameters CN(b). The uncorrelated noise signals may for example be generated in the frequency domain as:

$$N_{CN1}(k_b) = \text{rand}_1(k_b) \cdot CN(b)$$
$$N_{CN2}(k_b) = \text{rand}_2(k_b) \cdot CN(b) \quad (30)$$

where $\text{rand}_{1,2}(k)$ are pseudo random generators generating unit variance noise sequences, being scaled by the obtained comfort noise parameters CN(b) for the frequency bins $k_b$ of frequency sub-band b. FIG. 11 illustrates the CNG upmix in a geometric representation of multi-dimensional vectors (e.g. being frames of audio samples) in accordance with eq. (29). By synthesis of vectors with the correct length (energy) and correlation (angle α) as the encoder input channels L and R of FIG. 10, CNG with correct inter-channel level difference and coherence is obtained. As mentioned earlier, the CNG upmix may further include the control of inter-channel time and/or phase differences, or similar representations for an even more accurate CN generation with respect to the spatial characteristics of the input channels.

Further, it may be useful to control whether a transition between $\hat{N}_1$ and $N_2$ should done or whether the CNG would better be based on $N_2$ (and $N_{S1}$, $N_{S2}$) only. If $N_1$ is estimated on P only, it may be inaccurate if there are significant signal cancellations in P, e.g. happening for anti-correlated, or anti-phase input stereo channels.

In one embodiment, a decision whether to crossfade between the two background noise estimates or not is based on the energy relationship between the primary and the secondary channel, which in the time domain may be formulated as:

if ($SP_{ratio\,LT} < SP_{thr}$): CNG based on transition between $\hat{N}_1$ and $N_2$ (31)
else: CNG based on $N_2$ where $SP_{thr}$ = Threshold $$SP_{ratio} = \frac{E_S}{E_P} \quad (32)$$

if ($SP_{ratio} > SP_{ratio\,LT}$):

$SP_{ratio\,LT} = \alpha_{LP}SP_{ration\,LT} + (1 - \alpha_{LP})SP_{ratio}$ else: (33)

$SP_{ratio\,LT} = \beta_{LP}SP_{ration\,LT} + (1 - \beta_{LP})SP_{ratio}$

A good value of the threshold $SP_{thr}$ has been 2.0, though other values are also possible. $E_P$ and $E_S$ are given by:

$$E_P = \sum_{i=1}^{frame\,length} P(i)^2 \quad (34)$$

$$E_S = \sum_{i=1}^{frame\,length} S(i)^2$$

The low-pass filter coefficients $\alpha_{LP}$ and $\beta_{LP}$ should be in the range [0,1]. In one embodiment $\alpha=0.1$ and $\beta=1-\alpha=0.9$.

FIG. 9 illustrates an improved transition going from active coding of the first stereo mode to CNG in the second stereo mode. Compared to the transition illustrated in FIG. 4, it can be seen that the transition to CNG is smoother which results in a less audible transition and an increased perceptual performance for the stereo codec utilizing DTX for improved transmission efficiency.

Figure 8:
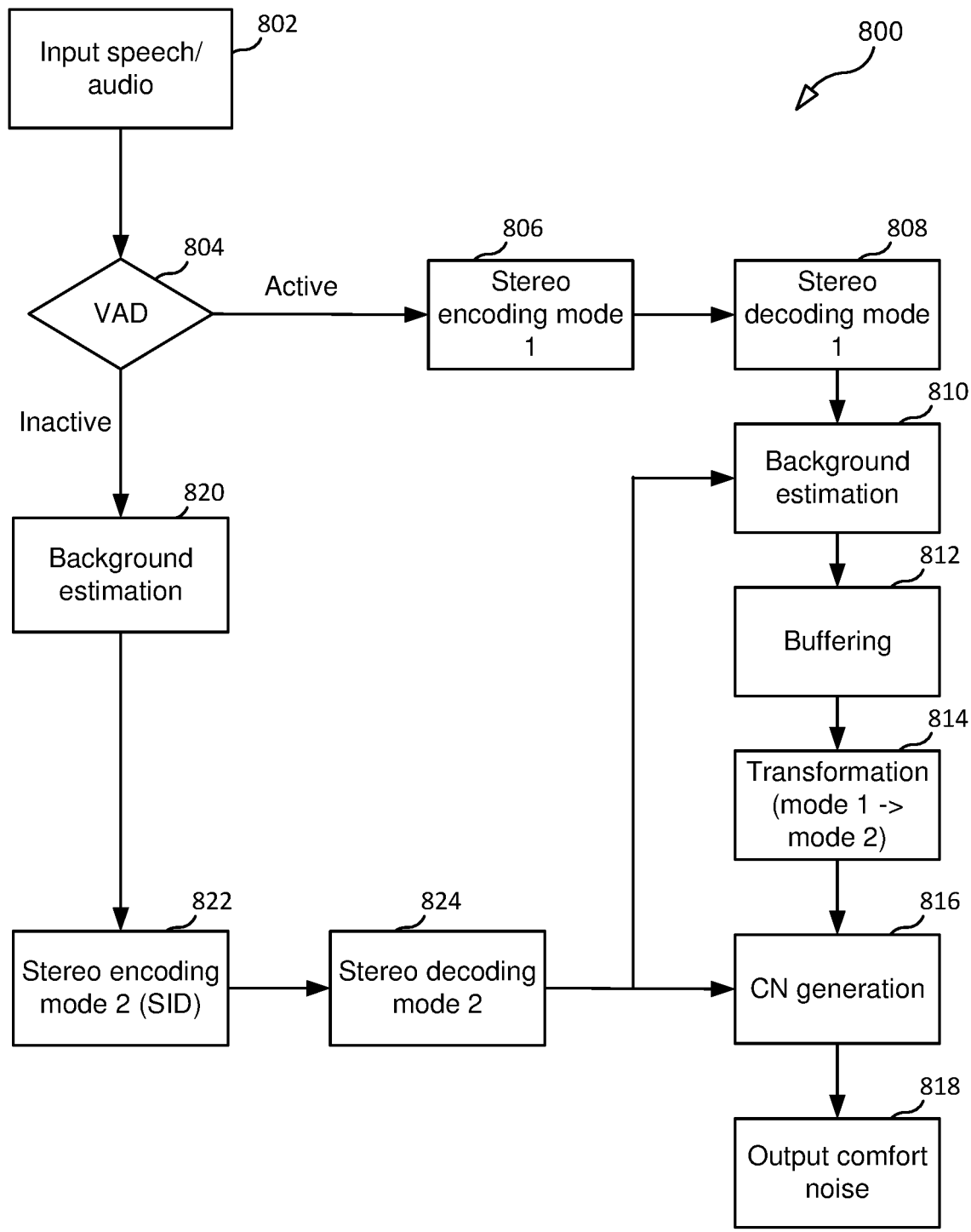
FIG. 8 is a flow chart according to an embodiment.

FIG. 8 is a flow chart of process 800 according to an embodiment. The process begins at block 802, with input speech/audio. Next, at block 802, a VAD (or a SAD) detects whether there is an active segment or an inactive segment.

If it is an active segment, at block 806, stereo encoding mode 1 is performed, followed by stereo decoding mode 1 at block 808. Next, at block 810, background estimation 810 is performed, followed by buffering at block 812, to be used for transformation of the background estimation (from mode 1 to mode 2) at block 814, comfort noise generation at block 816, and outputting comfort noise at block 818.

If it is an inactive segment, at block 820, background estimation is performed, followed by stereo encoding mode 2 (SID) at block 822 and stereo decoding mode 2 at block 824. The output of the stereo decoding mode 2 may be used at blocks 810 (background estimation) and 816 (CN generation). Typically, the transformation of the background estimation parameters being buffered is triggered in an inactive segment, followed by comfort noise generation at block 816, and outputting comfort noise at block 818.

Figure 12:
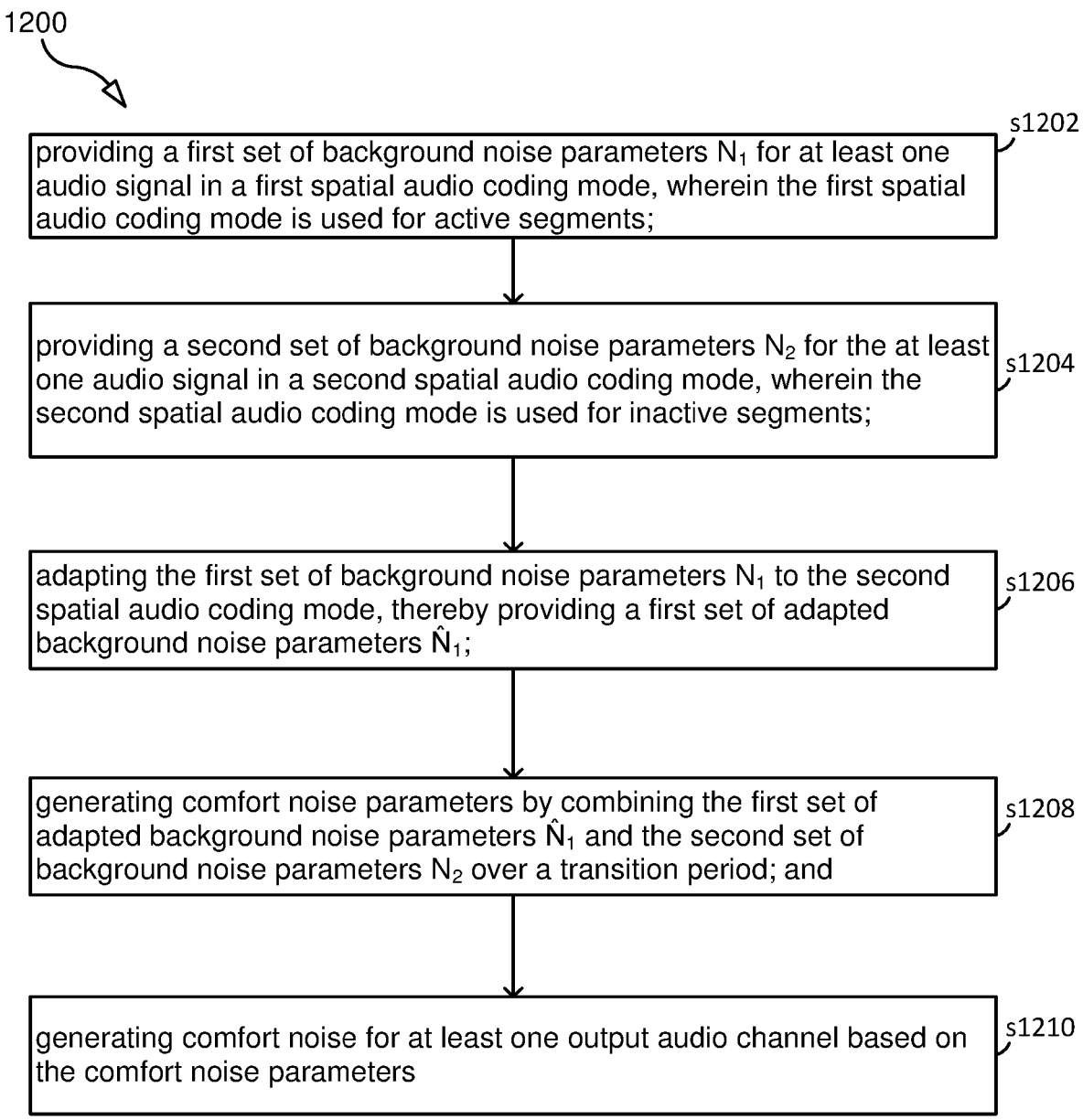
FIG. 12 is a flow chart according to an embodiment.

FIG. 12 illustrates a flow chart according to an embodiment. Process 1200 is a method performed by a node (e.g., a decoder). Process 1200 may begin with step s1202.

Step s1202 comprises providing a first set of background noise parameters $N_1$ for at least one audio signal in a first spatial audio coding mode, wherein the first spatial audio coding mode is used for active segments.

Step s1204 comprises providing a second set of background noise parameters $N_2$ for the at least one audio signal in a second spatial audio coding mode, wherein the second spatial audio coding mode is used for inactive segments.

Step s1206 comprises adapting the first set of background noise parameters $N_1$ to the second spatial audio coding mode, thereby providing a first set of adapted background noise parameters $\hat{N}_1$.

Step s1208 comprises generating comfort noise parameters by combining the first set of adapted background noise parameters $\hat{N}_1$ and the second set of background noise parameters $N_2$ over a transition period.

Step s1210 comprises generating comfort noise for at least one output audio channel based on the comfort noise parameters.

In some embodiments, generating comfort noise for the at least one output audio channel comprises applying the generated comfort noise parameters to at least one intermediate audio signal. In some embodiments, generating comfort noise for the at least one output audio channel comprises upmixing of the at least one intermediate audio signal. In some embodiments, the at least one audio signal is based on signals of at least two input audio channels, and wherein the first set of background noise parameters $N_1$ and the second set of background noise parameters $N_2$ are each based on a single audio signal wherein the single audio signal is based on a downmix of the signals of the at least two input audio channels. In some embodiments, the at least one output audio channel comprises at least two output audio channels. In some embodiments, providing a first set of background noise parameters $N_1$ comprises receiving the first set of background noise parameters $N_1$ from a node. In some embodiments, providing a second set of background noise parameters $N_2$ comprises receiving the second set of background noise parameters $N_2$ from a node.

In some embodiments, adapting the first set of background noise parameters $N_1$ to the second spatial audio coding mode comprises applying a transform function. In some embodiments, the transform function comprises a function of $N_1$, $NS_1$, and $NS_2$, wherein $NS_1$ comprises a first set of spatial coding parameters indicating downmixing and/or spatial properties of the background noise of the first spatial audio coding mode and $N_{S2}$ comprises a second set of spatial coding parameters indicating downmixing and/or spatial properties of the background noise of the second spatial audio coding mode. In some embodiments, applying the transform function includes computing $\hat{N}_1 = s_{trans} N_1$, wherein $s_{trans}$ is a scalar compensation factor.

In some embodiments, $s_{trans}$ has the following value:

$$s_{trans} = \frac{1}{2}\sqrt{\frac{1 + c + 2\sqrt{c \cdot C}}{c \cdot \text{ratio}_{LR}^2 + (1 - \text{ratio}_{LR})^2 + 2\text{ratio}_{LR}(1 - \text{ratio}_{LR})\sqrt{c \cdot C}}}$$

where $\text{ratio}_{LR}$ is a downmix ratio, C corresponds to a coherence or correlation coefficient, and c is given by $$c = \frac{(1+g)^2 + \gamma^2}{(1-g)^2 + \gamma^2} \approx \frac{|L|^2}{|R|^2}$$

where g and $\gamma$ are gain parameters, and L and R are respectively left and right channel inputs.

In some embodiments, the transition period is a fixed length of inactive frames. In some embodiments, the transition period is a variable length of inactive frames. In some embodiments, generating comfort noise by combining the first set of adapted background noise parameters $\hat{N}_1$ and the second set of background noise parameters $N_2$ over a transition period comprises applying a weighted average of $\hat{N}_1$ and $N_2$.

In some embodiments, generating comfort noise parameters by combining the first set of adapted background noise parameters $\hat{N}_1$ and the second set of background noise parameters $N_2$ over a transition period comprises computing $$CN = \left(1 - \frac{c_{inactive}}{k}\right)\hat{N}_1 + \frac{c_{inactive}}{k} N_2$$

where CN is the generated comfort noise, $c_{inactive}$ is the current inactive frame count, and k is a length of the transition period indicating a number of inactive frames for which to apply the weighted average of $\hat{N}_1$ and $N_2$. 17. In some embodiments, generating comfort noise parameters by combining the first set of adapted background noise parameters $\hat{N}_1$ and the second set of background noise parameters $N_2$ over a transition period comprises computing $$CN(b) = r_2(b)\hat{N}_1(b)$$

where $$r_2(b) = \min\left(1 + \frac{1}{k}(r_0(b) - 1)c_{inactive}, r_0(b)\right),$$

if $c_{inactive} < k \; r_2(b) = r_0(b),$ otherwise $r_0(b) = \frac{N_2(b)}{\hat{N}_1(b)}$ where CN is the generated comfort noise parameter, $c_{inactive}$ is the current inactive frame count, k is a length of the transition period indicating a number of inactive frames for which to apply the weighted average of $\hat{N}_1$ and $N_2$, and b is a frequency sub-band index. In some embodiments, generating comfort noise parameters comprises computing $$CN(k_b) = r_2(b)\hat{N}_1(k_b)$$

for at least one frequency coefficient $k_b$ of frequency sub-band b.

In some embodiments, k is determined as $$k = -Mr_1 + M, \text{if } r_1 < 1$$

$$k = -M\left(\frac{1}{r_1}\right) + M, \text{otherwise}$$

where M is a maximum value for k, and $r_1$ is an energy ratio of estimated background noise levels determined as follows:

$$r_1 = \sqrt{\frac{\sum_{b=b_0}^{b_{N-1}} \hat{N}_1(b)}{\sum_{b=b_0}^{b_{N-1}} N_2(b)}}$$

where $b = b_0, \ldots, b_{N-1}$ are N frequency sub-bands, $\hat{N}_1(b)$ refers to adapted background noise parameters of $\hat{N}_1$ for the given sub-band b, and $N_2(b)$ refers to adapted background noise parameters of $N_2$ for the given sub-band b.

In some embodiments, generating comfort noise parameters by combining the first set of adapted background noise parameters $\hat{N}_1$ and the second set of background noise parameters $N_2$ over a transition period comprises applying a non-linear combination of $\hat{N}_1$ and $N_2$. In some embodiments, the method further includes determining to generate comfort noise parameters by combining the first set of adapted background noise parameters $\hat{N}_1$ and the second set of background noise parameters $N_2$ over a transition period, wherein generating comfort noise parameters by combining the first set of adapted background noise parameters $\hat{N}_1$ and the second set of background noise parameters $N_2$ over a transition period is performed as a result of determining to generate comfort noise parameters by combining the first set of adapted background noise parameters $\hat{N}_1$ and the second set of background noise parameters $N_2$ over a transition period.

In some embodiments, determining to generate comfort noise parameters by combining the first set of adapted background noise parameters $\hat{N}_1$ and the second set of background noise parameters $N_2$ over a transition period is based on a evaluating a first energy of a primary channel and a second energy of a secondary channel. In some embodiments, one or more of the first set of background noise parameters $\hat{N}_1$, the second set of background noise parameters $N_2$, and the first set of adapted background noise parameters $\hat{N}_1$ include one or more parameters describing signal characteristics and/or spatial characteristics, including one or more of (i) linear prediction coefficients representing signal energy and spectral shape; (ii) an excitation energy; (iii) an inter-channel coherence; (iv) an inter-channel level difference; and (v) a side-gain parameter.

Figure 13:
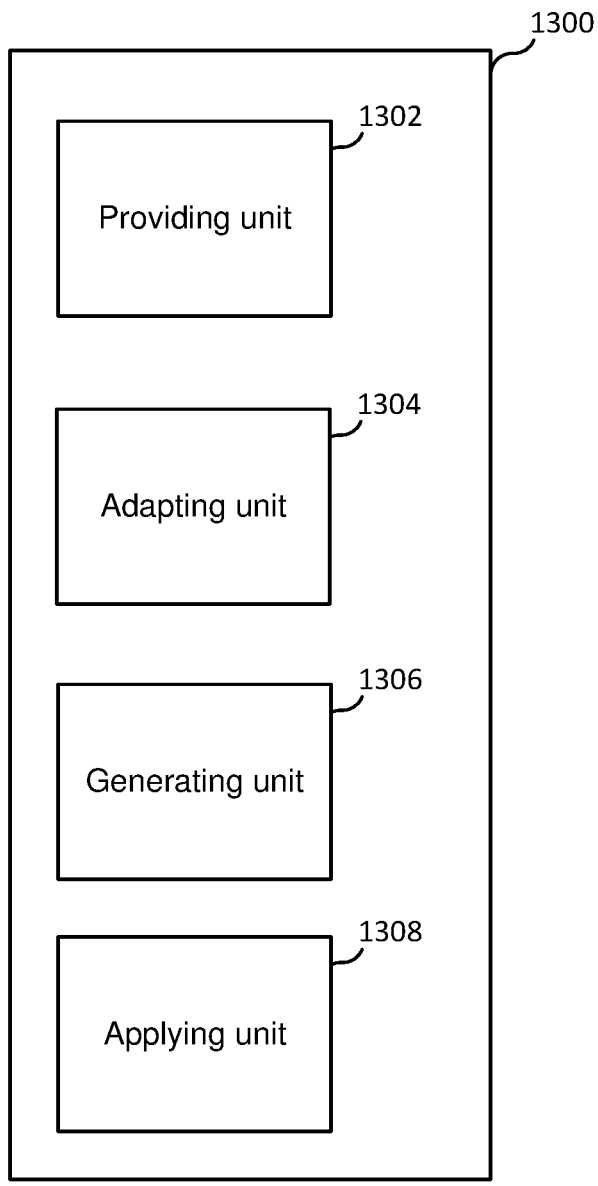
FIG. 13 is a block diagram of an apparatus according to an embodiment.

FIG. 13 is a block diagram of an apparatus according to an embodiment. As shown, a node 1300 (such as a decoder) may include a providing unit 1302, an adapting unit 1304, a generating unit 1306, and an applying unit 1308.

The providing unit 1302 is configured to provide a first set of background noise parameters $N_1$ for at least one audio signal in a first spatial audio coding mode, wherein the first spatial audio coding mode is used for active segments.

The providing unit 1302 is further configured to provide a second set of background noise parameters $N_2$ for the at least one audio signal in a second spatial audio coding mode, wherein the second spatial audio coding mode is used for inactive segments.

The adapting unit 1304 is configured to adapt the first set of background noise parameters $N_1$ to the second spatial audio coding mode, thereby providing a first set of adapted background noise parameters $\hat{N}_1$.

The generating unit 1306 is configured to generate comfort noise by combining the first set of adapted background noise parameters $\hat{N}_1$ and the second set of background noise parameters $N_2$ over a transition period.

The applying unit 1308 is configured to apply the generated comfort noise to at least one output audio channel.

Figure 14:
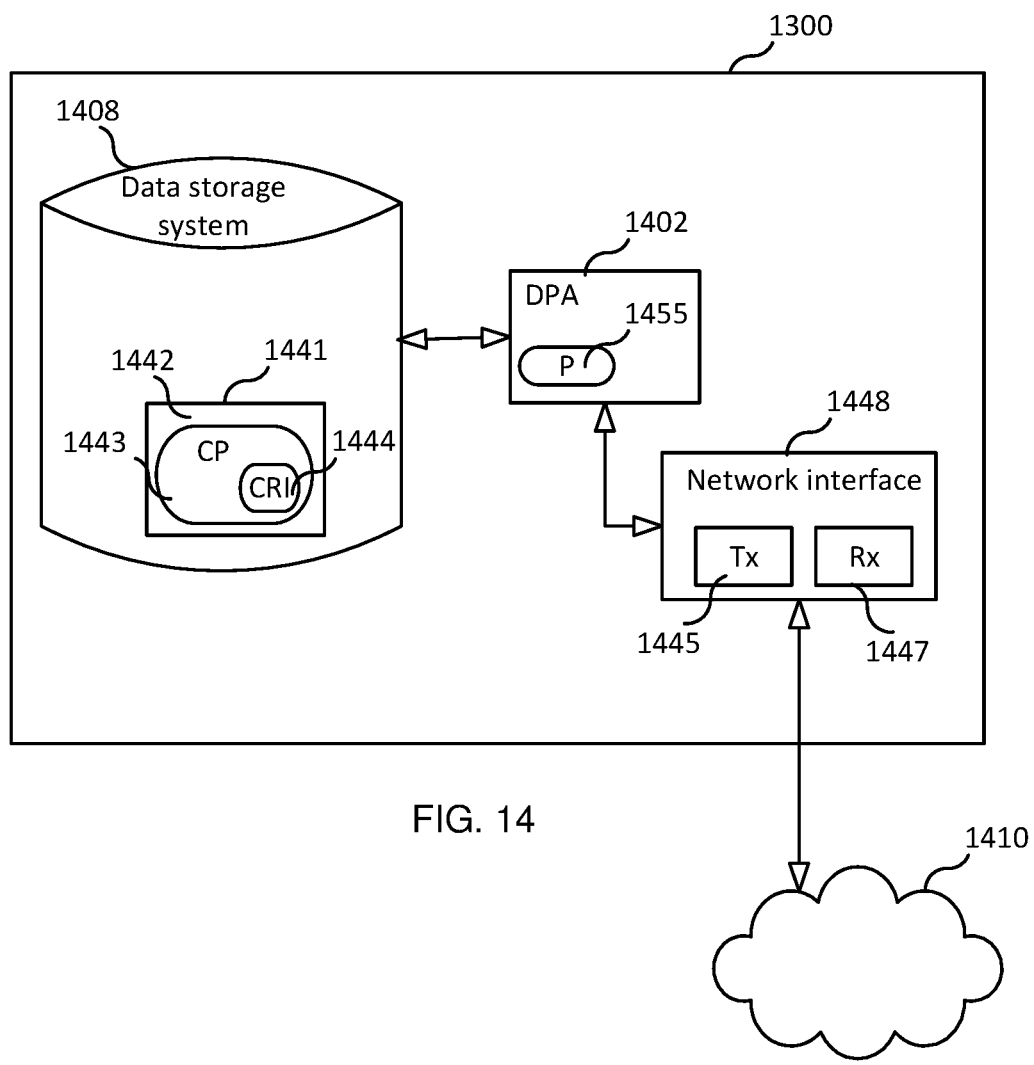
FIG. 14 is a block diagram of an apparatus according to an embodiment.

FIG. 14 is a block diagram of an apparatus 1300 (e.g. a node (such as a decoder)), according to some embodiments. As shown in FIG. 14, the apparatus may comprise: processing circuitry (PC) 1402, which may include one or more processors (P) 1455 (e.g., a general purpose microprocessor and/or one or more other processors, such as an application specific integrated circuit (ASIC), field-programmable gate arrays (FPGAs), and the like); a network interface 948 comprising a transmitter (Tx) 1445 and a receiver (Rx) 1447 for enabling the apparatus to transmit data to and receive data from other nodes connected to a network 1410 (e.g., an Internet Protocol (IP) network) to which network interface 1448 is connected; and a local storage unit (a.k.a., "data storage system") 1408, which may include one or more non-volatile storage devices and/or one or more volatile storage devices. In embodiments where PC 1402 includes a programmable processor, a computer program product (CPP) 1441 may be provided. CPP 1441 includes a computer readable medium (CRM) 1442 storing a computer program (CP) 1443 comprising computer readable instructions (CRI) 1444. CRM 1442 may be a non-transitory computer readable medium, such as, magnetic media (e.g., a hard disk), optical media, memory devices (e.g., random access memory, flash memory), and the like. In some embodiments, the CRI 1444 of computer program 1443 is configured such that when executed by PC 1402, the CRI causes the apparatus to perform steps described herein (e.g., steps described herein with reference to the flow charts). In other embodiments, the apparatus may be configured to perform steps described herein without the need for code. That is, for example, PC 1402 may consist merely of one or more ASICs. Hence, the features of the embodiments described herein may be implemented in hardware and/or software.

CONCISE DESCRIPTION OF VARIOUS EMBODIMENTS

A1. A method for generating comfort noise comprising:
providing a first set of background noise parameters $N_1$ for at least one audio signal in a first spatial audio coding mode, wherein the first spatial audio coding mode is used for active segments;
providing a second set of background noise parameters $N_2$ for the at least one audio signal in a second spatial audio coding mode, wherein the second spatial audio coding mode is used for inactive segments;
adapting the first set of background noise parameters $N_1$ to the second spatial audio coding mode, thereby providing a first set of adapted background noise parameters
generating comfort noise parameters by combining the first set of adapted background noise parameters $\hat{N}_1$ and the second set of background noise parameters $N_2$ over a transition period; and
generating comfort noise for at least one output audio channel based on the comfort noise parameters.

A1a. The method of embodiment A1, wherein generating comfort noise for the at least one output audio channel comprises applying the generated comfort noise parameters to at least one intermediate audio signal.

A1b. The method of embodiment A1a, wherein generating comfort noise for the at least one output audio channel comprises upmixing of the at least one intermediate audio signal.

A2. The method of any one of embodiments A1, A1a, and A1b, wherein the at least one audio signal is based on signals of at least two input audio channels, and wherein the first set of background noise parameters $N_1$ and the second set of background noise parameters $N_2$ are each based on a single audio signal wherein the single audio signal is based on a downmix of the signals of the at least two audio channels.

A3. The method of any one of embodiments A1-A2, wherein the at least one output audio channel comprises at least two output audio channels.

A4. The method of any one of embodiments A1-A3, wherein providing a first set of background noise parameters $N_1$ comprises receiving the first set of background noise parameters $N_1$ from a node.

A5. The method of any one of embodiments A1-A4, wherein providing a second set of background noise parameters $N_2$ comprises receiving the second set of background noise parameters $N_2$ from a node.

A6. The method of embodiment A1, wherein adapting the first set of background noise parameters $N_1$ to the second spatial audio coding mode comprises applying a transform function.

A7. The method of embodiment A6, wherein the transform function comprises a function of $N_1$, $NS_1$, and $NS_2$, wherein $NS_1$ comprises a first set of spatial coding parameters indicating downmixing and/or spatial properties of the background noise of the first spatial audio coding mode and $NS_2$ comprises a second set of spatial coding parameters indicating downmixing and/or spatial properties of the background noise of the second spatial audio coding mode.

A8. The method of any one of embodiments A6-A7, wherein applying the transform function comprises computing $\hat{N}_1 = s_{trans} N_1$, wherein $s_{trans}$ is a scalar compensation factor.

A9. The method of embodiment A8, wherein $s_{trans}$ has the following value:

$$s_{trans} = \frac{1}{2}\sqrt{\frac{1+c+2\sqrt{c \cdot C}}{c \cdot \text{ratio}_{LR}^2 + (1-\text{ratio}_{LR})^2 + 2\text{ratio}_{LR}(1-\text{ratio}_{LR})\sqrt{c \cdot C}}}$$

where $\text{ratio}_{LR}$ is a downmix ratio, C corresponds to a coherence or correlation coefficient, and c is given by $$c = \frac{(1+g)^2 + \gamma^2}{(1-g)^2 + \gamma^2}$$

where g and $\gamma$ are gain parameters.

A9a. The method of embodiment A8, wherein $s_{trans}$ has the following value:

$$s_{trans} = \frac{1}{2}\sqrt{\frac{1+c+2\sqrt{c \cdot C}}{c \cdot \text{ratio}_{LR}^2 + (1-\text{ratio}_{LR})^2 s_{right}^2 + 2\text{ratio}_{LR}(1-\text{ratio}_{LR})s_{right}\sqrt{c \cdot C}}}$$

where $\text{ratio}_{LR}$ is a downmix ratio, C corresponds to a coherence or correlation coefficient, and c is given by $$c = \frac{(1+g)^2 + \gamma^2}{(1-g)^2 + \gamma^2}$$

where g, $\gamma$ and $s_{right}$ are gain parameters.

A10. The method of any one of embodiments A1-A9a, wherein the transition period is a fixed length of inactive frames.

A11. The method of any one of embodiments A1-A9a, wherein the transition period is a variable length of inactive frames.

A12. The method of any one of embodiments A1-A11, wherein generating comfort noise by combining the first set of adapted background noise parameters $\hat{N}_1$ and the second set of background noise parameters $N_2$ over a transition period comprises applying a weighted average of $\hat{N}_1$ and $N_2$.

A13. The method of any one of embodiments A1-A12, wherein generating comfort noise parameters by combining the first set of adapted background noise parameters $\hat{N}_1$ and the second set of background noise parameters $N_2$ over a transition period comprises computing $$CN = \left(1 - \frac{c_{inactive}}{k}\right)\hat{N}_1 + \frac{c_{inactive}}{k} N_2$$

where CN is the generated comfort noise parameter, $c_{inactive}$ is the current inactive frame count, and k is a length of the transition period indicating a number of inactive frames for which to apply the weighted average of $\hat{N}_1$ and $N_2$.

A13a. The method of any one of embodiments A1-A12, wherein generating comfort noise parameters by combining the first set of adapted background noise parameters $\hat{N}_1$ and the second set of background noise parameters $N_2$ over a transition period comprises computing $$CN(b) = r_2(b)\hat{N}_1(b)$$

where $$r_2(b) = \min\left(1 + \frac{1}{k}(r_0(b) - 1)c_{inactive}, r_0(b)\right),$$

if $c_{inactive} < k$ $r_2(b) = r_0(b)$, otherwise $r_0(b) = \frac{N_2(b)}{\hat{N}_1(b)}$ where CN is the generated comfort noise parameter, $c_{inactive}$ is the current inactive frame count, k is a length of the transition period indicating a number of inactive frames for which to apply the weighted average of $\hat{N}_1$ and $N_2$, and b is a frequency sub-band index.

A13b. The method of embodiment A13a, wherein generating comfort noise parameters comprises computing $$CN(k_b) = r_2(b)\hat{N}_1(k_b)$$

for at least one frequency coefficient $k_b$ of frequency sub-band b.

A14. The method of any one of embodiments A13, A13a, and A13b, wherein k is determined as $$k = -Mr_1 + M, \text{ if } r_1 < 1$$

$$k = -M\left(\frac{1}{r_1}\right) + M, \text{ otherwise}$$

where M is a maximum value for k, and $r_1$ is an energy ratio of estimated background noise levels determined as follows:

$$r_1 = \sqrt{\frac{\sum_{b=b_0}^{b_{N-1}} \hat{N}_1(b)}{\sum_{b=b_0}^{b_{N-1}} N_2(b)}}$$

where $b = b_0, \ldots, b_{N-1}$ are N frequency sub-bands, $\hat{N}_1(b)$ refers to adapted background noise parameters of $\hat{N}_1$ for the given sub-band b, and $N_2(b)$ refers to adapted background noise parameters of $N_2$ for the given sub-band b.

A15. The method of any one of embodiments A1-A11, wherein generating comfort noise parameters by combining the first set of adapted background noise parameters $\hat{N}_1$ and the second set of background noise parameters $N_2$ over a transition period comprises applying a non-linear combination of $\hat{N}_1$ and $N_2$.

A16 The method of any one of embodiments A1-A15, further comprising determining to generate comfort noise parameters by combining the first set of adapted background noise parameters $\hat{N}_1$ and the second set of background noise parameters $N_2$ over a transition period, wherein generating comfort noise parameters by combining the first set of adapted background noise parameters $\hat{N}_1$ and the second set of background noise parameters $N_2$ over a transition period is performed as a result of determining to generate comfort noise parameters by combining the first set of adapted background noise parameters $\hat{N}_1$ and the second set of background noise parameters $N_2$ over a transition period.

A17. The method of embodiment A16, wherein determining to generate comfort noise parameters by combining the first set of adapted background noise parameters $\hat{N}_1$ and the second set of background noise parameters $N_2$ over a transition period is based on a evaluating a first energy of a primary channel and a second energy of a secondary channel.

A18. The method of any one of embodiments A1-A17, wherein one or more of the first set of background noise parameters $N_1$, the second set of background noise parameters $N_2$, and the first set of adapted background noise parameters $\hat{N}_1$ include one or more parameters describing signal characteristics and/or spatial characteristics, including one or more of (i) linear prediction coefficients representing signal energy and spectral shape; (ii) an excitation energy; (iii) an inter-channel coherence; (iv) an inter-channel level difference; and (v) a side-gain parameter.

B1. A node, the node comprising processing circuitry and a memory containing instructions executable by the processing circuitry, whereby the processing circuitry is operable to:

provide a first set of background noise parameters $N_1$ for at least one audio signal in a first spatial audio coding mode, wherein the first spatial audio coding mode is used for active segments;

provide a second set of background noise parameters $N_2$ for the at least one audio signal in a second spatial audio coding mode, wherein the second spatial audio coding mode is used for inactive segments;

adapt the first set of background noise parameters $N_1$ to the second spatial audio coding mode, thereby providing a first set of adapted background noise parameters $\hat{N}_1$;

generate comfort noise parameters by combining the first set of adapted background noise parameters $\hat{N}_1$ and the second set of background noise parameters $N_2$ over a transition period; and generate comfort noise for at least one output audio channel based on the comfort noise parameters.

B1a. The node of embodiment B1, wherein generating comfort noise for the at least one output audio channel comprises applying the generated comfort noise parameters to at least one intermediate audio signal.

B1b. The node of embodiment B1a, wherein generating comfort noise for the at least one output audio channel comprises upmixing of the at least one intermediate audio signal.

B2. The node of any one of embodiments B1, B1a, and B1b, wherein the at least one audio signal is based on signals of at least two input audio channels, and wherein the first set of background noise parameters $N_1$ and the second set of background noise parameters $N_2$ are each based on a single audio signal wherein the single audio signal is based on a downmix of the signals of the at least two input audio channels.

B3. The node of any one of embodiments B1-B2, wherein the at least one output audio channel comprises at least two output audio channels.

B4. The node of any one of embodiments B1-B3, wherein providing a first set of background noise parameters $N_1$ comprises receiving the first set of background noise parameters $N_1$ from a node.

B5. The node of any one of embodiments B1-B4, wherein providing a second set of background noise parameters $N_2$ comprises receiving the second set of background noise parameters $N_2$ from another node.

B5a. The node of embodiment B5, wherein the another node comprises an encoder.

B6. The node of embodiment B1, wherein adapting the first set of background noise parameters $N_1$ to the second spatial audio coding mode comprises applying a transform function.

B7. The node of embodiment B6, wherein the transform function comprises a function of $N_1$, $NS_1$, and $NS_2$, wherein $NS_1$ comprises a first set of spatial coding parameters indicating downmixing and/or spatial properties of the background noise of the first spatial audio coding mode and $NS_2$ comprises a second set of spatial coding parameters indicating downmixing and/or spatial properties of the background noise of the second spatial audio coding mode.

B8. The node of any one of embodiments B6-B7, wherein applying the transform function comprises computing $\hat{N}_1 = s_{trans} N_1$, wherein $s_{trans}$ is a scalar compensation factor.

B9. The node of embodiment B8, wherein $s_{trans}$ has the following value:

$$s_{trans} = \frac{1}{2}\sqrt{\frac{1 + c + 2\sqrt{c \cdot C}}{c \cdot \text{ratio}_{LR}^2 + (1 - \text{ratio}_{LR})^2 + 2\text{ratio}_{LR}(1 - \text{ratio}_{LR})\sqrt{c \cdot C}}}$$

where $\text{ratio}_{LR}$ is a downmix ratio, C corresponds to a coherence or correlation coefficient, and c is given by $$c = \frac{(1 + g)^2 + \gamma^2}{(1 - g)^2 + \gamma^2}$$

where g and $\gamma$ are gain parameters.

B9a. The node of embodiment B8, wherein $s_{trans}$ has the following value:

$$s_{trans} = \frac{1}{2}\sqrt{\frac{1 + c + 2\sqrt{c \cdot C}}{c \cdot \text{ratio}_{LR}^2 + (1 - \text{ratio}_{LR})^2 s_{right}^2 + 2\text{ratio}_{LR}(1 - \text{ratio}_{LR})s_{right}\sqrt{c \cdot C}}}$$

where $\text{ratio}_{LR}$ is a downmix ratio, C corresponds to a coherence or correlation coefficient, and c is given by $$c = \frac{(1 + g)^2 + \gamma^2}{(1 - g)^2 + \gamma^2}$$

where g, $\gamma$ and $s_{right}$ are gain parameters.

B10. The node of any one of embodiments B1-B9a, wherein the transition period is a fixed length of inactive frames.

B11. The node of any one of embodiments B1-B9a, wherein the transition period is a variable length of inactive frames.

B12. The node of any one of embodiments B1-B11, wherein generating comfort noise parameters by combining the first set of adapted background noise parameters $\hat{N}_1$ and the second set of background noise parameters $N_2$ over a transition period comprises applying a weighted average of $\hat{N}_1$ and $N_2$.

B13. The node of any one of embodiments B1-B12, wherein generating comfort noise parameters by combining the first set of adapted background noise parameters $\hat{N}_1$ and the second set of background noise parameters $N_2$ over a transition period comprises computing $$CN = \left(1 - \frac{c_{inactive}}{k}\right)\hat{N}_1 + \frac{c_{inactive}}{k}N_2$$

where CN is the generated comfort noise parameter, $c_{inactive}$ is the current inactive frame count, and k is a length of the transition period indicating a number of inactive frames for which to apply the weighted average of $\hat{N}_1$ and $N_2$.

B13a. The node of any one of embodiments B1-B12, wherein generating comfort noise parameters by combining the first set of adapted background noise parameters $\hat{N}_1$ and the second set of background noise parameters $N_2$ over a transition period comprises computing $$CN(b) = r_2(b)\hat{N}_1(b)$$

where $$r_2(b) = \min\left(1 + \frac{1}{k}(r_0(b) - 1)c_{inactive}, r_0(b)\right), \text{ if } c_{inactive} < k$$

$$r_2(b) = r_0(b), \text{ otherwise}$$

$$r_0(b) = \frac{N_2(b)}{\hat{N}_1(b)}$$

where CN is the generated comfort noise parameter, $c_{inactive}$ is the current inactive frame count, k is a length of the transition period indicating a number of inactive frames for which to apply the weighted average of $\hat{N}_1$ and $N_2$, and b is a frequency sub-band index.

B13b. The node of embodiment B13a, wherein generating comfort noise parameters comprises computing $$CN(k_b) = r_2(b)\hat{N}_1(k_b)$$

for at least one frequency coefficient $k_b$ of frequency sub-band b.

B14. The node of any one of embodiments B13, B13a, and B13b, wherein k is determined as $$k = -Mr_1 + M, \text{ if } r_1 < 1$$

$$k = -M\left(\frac{1}{r_1}\right) + M, \text{ otherwise}$$

where M is a maximum value for k, and $r_1$ is an energy ratio of estimated background noise levels determined as follows:

$$r_1 = \sqrt{\frac{\sum_{b=b_0}^{b_{N-1}} \hat{N}_1(b)}{\sum_{b=b_0}^{b_{N-1}} N_2(b)}}$$

where $b = b_0, \ldots, b_{N-1}$ are N frequency sub-bands, $\hat{N}_1(b)$ refers to adapted background noise parameters of $\hat{N}_1$ for the given sub-band b, and $N_2$ (b) refers to adapted background noise parameters of $N_2$ for the given sub-band b.

B15. The node of any one of embodiments B1-B11, wherein generating comfort noise by combining the first set of adapted background noise parameters $\hat{N}_1$ and the second set of background noise parameters $N_2$ over a transition period comprises applying a non-linear combination of $\hat{N}_1$ and $N_2$.

B16 The node of any one of embodiments B1-B15, further comprising determining to generate comfort noise parameters by combining the first set of adapted background noise parameters $\hat{N}_1$ and the second set of background noise parameters $N_2$ over a transition period, wherein generating comfort noise parameters by combining the first set of adapted background noise parameters $\hat{N}_1$ and the second set of background noise parameters $N_2$ over a transition period is performed as a result of determining to generate comfort noise parameters by combining the first set of adapted background noise parameters $\hat{N}_1$ and the second set of background noise parameters $N_2$ over a transition period.

B17. The node of embodiment B16, wherein determining to generate comfort noise parameters by combining the first set of adapted background noise parameters $\hat{N}_1$ and the second set of background noise parameters $N_2$ over a transition period is based on a evaluating a first energy of a primary channel and a second energy of a secondary channel.

B18. The node of any one of embodiments B1-B17, wherein one or more of the first set of background noise parameters $N_1$, the second set of background noise parameters $N_2$, and the first set of adapted background noise parameters $\hat{N}_1$ include one or more parameters describing signal characteristics and/or spatial characteristics, including one or more of (i) linear prediction coefficients representing signal energy and spectral shape; (ii) an excitation energy; (iii) an inter-channel coherence; (iv) an inter-channel level difference; and (v) a side-gain parameter.

B19. The node of any one of embodiments B1-B18, wherein the node comprises a decoder.

B20. The node of any one of embodiments B1-B18, wherein the node comprises an encoder.

C1. A computer program comprising instructions which when executed by processing circuitry causes the processing circuitry to perform the method of any one of embodiments A1-A18.

C2. A carrier containing the computer program of embodiment C1, wherein the carrier is one of an electronic signal, an optical signal, a radio signal, and a computer readable storage medium.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for generating comfort noise comprising:
providing a first set of background noise parameters $N_1$ for at least one audio signal in a first spatial audio coding mode, wherein the first spatial audio coding mode is used for active segments;
providing a second set of background noise parameters $N_2$ for the at least one audio signal in a second spatial audio coding mode, wherein the second spatial audio coding mode is used for inactive segments;
adapting the first set of background noise parameters $N_1$ to the second spatial audio coding mode, thereby providing a first set of adapted background noise parameters $\hat{N}_1$;
generating comfort noise parameters by combining the first set of adapted background noise parameters $\hat{N}_1$ and the second set of background noise parameters $N_2$ over a transition period; and
generating comfort noise for at least one output audio channel based on the comfort noise parameters.

2. The method of claim 1, wherein generating comfort noise for the at least one output audio channel comprises applying the generated comfort noise parameters to at least one intermediate audio signal.

3. The method of claim 1, wherein generating comfort noise for the at least one output audio channel comprises upmixing of the at least one intermediate audio signal.

4. The method of claim 1, wherein the at least one audio signal is based on signals of at least two input audio channels, and wherein the first set of background noise parameters $N_1$ and the second set of background noise parameters $N_2$ are each based on a single audio signal wherein the single audio signal is based on a downmix of the signals of the at least two input audio channels.

5. The method of claim 1, wherein the at least one output audio channel comprises at least two output audio channels.

6. The method of claim 1, wherein providing a first set of background noise parameters $N_1$ comprises receiving the first set of background noise parameters $N_1$ from a node.

7. The method of claim 1, wherein providing a second set of background noise parameters $N_2$ comprises receiving the second set of background noise parameters $N_2$ from a node.

8. The method of claim 1, wherein adapting the first set of background noise parameters $N_1$ to the second spatial audio coding mode comprises applying a transform function.

9. The method of claim 8, wherein the transform function comprises a function of $N_1$, $NS_1$, and $NS_2$, wherein $NS_1$ comprises a first set of spatial coding parameters indicating downmixing and/or spatial properties of the background noise of the first spatial audio coding mode and $NS_2$ comprises a second set of spatial coding parameters indicating downmixing and/or spatial properties of the background noise of the second spatial audio coding mode.

10. The method of claim 8, wherein applying the transform function comprises computing $\hat{N}_1 = s_{trans} N_1$, wherein $s_{trans}$ is a scalar compensation factor.

11. The method of claim 10, wherein $s_{trans}$ has the following value:

$$s_{trans} = \frac{1}{2}\sqrt{\frac{1+c+2\sqrt{c \cdot C}}{c \cdot \text{ratio}_{LR}^2 + (1-\text{ratio}_{LR})^2 + 2\text{ratio}_{LR}(1-\text{ratio}_{LR})\sqrt{c \cdot C}}}$$

where $\text{ratio}_{LR}$ is a downmix ratio, C corresponds to a coherence or correlation coefficient, and c is given by $$c = \frac{(1+g)^2 + \gamma^2}{(1-g)^2 + \gamma^2}$$

where g and γ are gain parameters.

12. The method of claim 10, wherein $s_{trans}$ has the following value:

$$s_{trans} = \frac{1}{2}\sqrt{\frac{1 + c + 2\sqrt{c \cdot C}}{c \cdot \text{ratio}_{LR}^2 + (1 - \text{ratio}_{LR})^2 s_{right}^2 + 2\text{ratio}_{LR}(1 - \text{ratio}_{LR})s_{right}\sqrt{c \cdot C}}}$$

where $\text{ratio}_{LR}$ is a downmix ratio, C corresponds to a coherence or correlation coefficient, and c is given by $$c = \frac{(1+g)^2 + \gamma^2}{(1-g)^2 + \gamma^2}$$

where g, γ and $s_{right}$ are gain parameters.

13. The method of claim 1, wherein the transition period is a fixed length of inactive frames.

14. The method of claim 1, wherein the transition period is a variable length of inactive frames.

15. The method of claim 1, wherein generating comfort noise by combining the first set of adapted background noise parameters $\hat{N}_1$ and the second set of background noise parameters $N_2$ over a transition period comprises applying a weighted average of $\hat{N}_1$ and $N_2$.

16. The method of claim 1, wherein generating comfort noise parameters by combining the first set of adapted background noise parameters $\hat{N}_1$ and the second set of background noise parameters $N_2$ over a transition period comprises computing $$CN = \left(1 - \frac{c_{inactive}}{k}\right)\hat{N}_1 + \frac{c_{inactive}}{k}N_2$$

where CN is the generated comfort noise parameter, $c_{inactive}$ is the current inactive frame count, and k is a length of the transition period indicating a number of inactive frames for which to apply the weighted average of $\hat{N}_1$ and $N_2$.

17. The method of claim 1, wherein generating comfort noise parameters by combining the first set of adapted background noise parameters $\hat{N}_1$ and the second set of background noise parameters $N_2$ over a transition period comprises computing $$CN(b) = r_2(b)\hat{N}_1(b)$$

where $$r_2(b) = \min\left(1 + \frac{1}{k}(r_0(b) - 1)c_{inactive}, r_0(b)\right), \text{ if } c_{inactive} < k$$

$$r_2(b) = r_0(b), \text{ otherwise}$$

$$r_0(b) = \frac{N_2(b)}{\hat{N}_1(b)}$$

where CN is the generated comfort noise parameter, $c_{inactive}$ is the current inactive frame count, k is a length of the transition period indicating a number of inactive frames for which to apply the weighted average of $\hat{N}_1$ and $N_2$, and b is a frequency sub-band index.

18. The method of claim 17, wherein generating comfort noise parameters comprises computing $CN(k_b) = r_2(b)\hat{N}_1(k_b)$ for at least one frequency coefficient $k_b$ of frequency sub-band b.

19. The method of claim 16, wherein k is determined as $$k = -Mr_1 + M, \text{ if } r_1 < 1$$

$$k = -M\left(\frac{1}{r_1}\right) + M, \text{ otherwise}$$

where M is a maximum value for k, and $r_1$ is an energy ratio of estimated background noise levels determined as follows:

$$r_1 = \sqrt{\frac{\sum_{b=b_0}^{b_{N-1}} \hat{N}_1(b)}{\sum_{b=b_0}^{b_{N-1}} N_2(b)}}$$

where $b = b_0, \ldots, b_{N-1}$ are N frequency sub-bands, $\hat{N}_1(b)$ refers to adapted background noise parameters of $\hat{N}_1$ for the given sub-band b, and $N_2(b)$ refers to adapted background noise parameters of $N_2$ for the given sub-band b.

20. The method of claim 1, wherein generating comfort noise parameters by combining the first set of adapted background noise parameters $\hat{N}_1$ and the second set of background noise parameters $N_2$ over a transition period comprises applying a non-linear combination of $\hat{N}_1$ and $N_2$.

21. The method of claim 1, further comprising determining to generate comfort noise parameters by combining the first set of adapted background noise parameters $\hat{N}_1$ and the second set of background noise parameters $N_2$ over a transition period, wherein generating comfort noise parameters by combining the first set of adapted background noise parameters $\hat{N}_1$ and the second set of background noise parameters $N_2$ over a transition period is performed as a result of determining to generate comfort noise parameters by combining the first set of adapted background noise parameters $\hat{N}_1$ and the second set of background noise parameters $N_2$ over a transition period.

22. The method of claim 21, wherein determining to generate comfort noise parameters by combining the first set of adapted background noise parameters $\hat{N}_1$ and the second set of background noise parameters $N_2$ over a transition period is based on a evaluating a first energy of a primary channel and a second energy of a secondary channel.

23. The method of claim 1, wherein one or more of the first set of background noise parameters $N_1$, the second set of background noise parameters $N_2$, and the first set of adapted background noise parameters $\hat{N}_1$ include one or more parameters describing signal characteristics and/or spatial characteristics, including one or more of (i) linear prediction coefficients representing signal energy and spectral shape; (ii) an excitation energy; (iii) an inter-channel coherence; (iv) an inter-channel level difference; and (v) a side-gain parameter.

24. A node, the node comprising processing circuitry and a memory containing instructions executable by the processing circuitry, wherein the node is configured to:

provide a first set of background noise parameters $N_1$ for at least one audio signal in a first spatial audio coding mode, wherein the first spatial audio coding mode is used for active segments;

provide a second set of background noise parameters $N_2$ for the at least one audio signal in a second spatial audio coding mode, wherein the second spatial audio coding mode is used for inactive segments;

adapt the first set of background noise parameters $N_1$ to the second spatial audio coding mode, thereby providing a first set of adapted background noise parameters $\hat{N}_1$;

generate comfort noise parameters by combining the first set of adapted background noise parameters $\hat{N}_1$ and the second set of background noise parameters $N_2$ over a transition period; and generate comfort noise for at least one output audio channel based on the comfort noise parameters.

25. The node of claim 24, wherein
the node comprises an encoder, or
the node comprises a decoder.

26. A non-transitory computer readable storing medium storing a computer program comprising instructions which when executed by processing circuitry of a node causes node to perform the method of claim 1.

* * * * *